US006627818B2

(12) United States Patent
Kamel et al.

(10) Patent No.: US 6,627,818 B2
(45) Date of Patent: Sep. 30, 2003

(54) ELECTRICAL CONNECTION PROTECTOR KIT AND METHOD FOR USING THE SAME

(75) Inventors: Sherif I. Kamel, Apex, NC (US); Kenton Archibald Blue, Holly Springs, NC (US); Jimmy E. Marks, Dunn, NC (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 09/968,390

(22) Filed: Oct. 1, 2001

(65) Prior Publication Data

US 2002/0039858 A1 Apr. 4, 2002

Related U.S. Application Data

(60) Provisional application No. 60/237,229, filed on Oct. 2, 2000.

(51) Int. Cl.[7] .............................................. H02G 15/04

(52) U.S. Cl. ...................................... 174/77 R; 174/79

(58) Field of Search ........................... 174/79, 93, 188, 174/77 R

(56) References Cited

U.S. PATENT DOCUMENTS 4,751,350 A * 6/1988 Eaton .......................... 174/87
4,880,676 A 11/1989 Puigcerver et al. ........ 428/35.7
4,888,070 A 12/1989 Clark et al. ................... 156/48
5,099,088 A 3/1992 Usami et al. ................. 174/76
5,399,811 A * 3/1995 Fremgen et al. .............. 174/93
5,561,269 A 10/1996 Robertson et al. ............ 174/92
5,625,167 A * 4/1997 Van Noten et al. ....... 174/77 R
5,792,989 A * 8/1998 Smith ....................... 174/77 R
5,824,954 A 10/1998 Biche et al. .............. 174/74 A
5,828,005 A 10/1998 Huynh-Ba et al. ............ 174/92
5,895,890 A * 4/1999 Uchiyama et al. ........ 174/77 R
5,912,433 A * 6/1999 Pulido et al. ............. 174/77 R
5,962,811 A 10/1999 Rodrigues et al. ............ 174/76
6,429,374 B2 * 8/2002 Buard ......................... 174/93

OTHER PUBLICATIONS

*Splice Insulators*, T&B, pp. M195 and M196, Jan. 21, 1985.

* cited by examiner

*Primary Examiner*—Dean A. Reichard
*Assistant Examiner*—Adolfo Nino
(74) *Attorney, Agent, or Firm*—Myers Bigel Sibley & Sajovec

(57) ABSTRACT

A connection protector kit for use with a plurality of electrical stub connections includes a cap defining an opening and having an interior, wall defining a cavity. The cavity communicates with the opening. A separator insert defines an insert axis and includes a plurality of holding walls. Each of the holding walls is adapted to hold a respective one of the stub connections. A plurality of axially extending separator walls are interposed between adjacent ones of the holding walls. The cavity is adapted to receive the separator insert and the stub connections.

42 Claims, 36 Drawing Sheets

ELECTRICAL CONNECTION PROTECTOR KIT AND METHOD FOR USING THE SAME

RELATED APPLICATIONS AND INCORPORATED BY REFERENCE

The present application claims the benefit of and priority from U.S. Provisional Application Ser. No. 60/237,229, filed Oct. 2, 2000, the disclosure of which is hereby incorporated herein by reference in its entirety. The disclosures of U.S. patent application Ser. No. 09/539,541, filed Mar. 31, 2000, and pending U.S. patent application Ser. No. 09/660,062, filed Sep. 12, 2000, are hereby incorporated herein by reference in their entireties.

FIELD OF THE INVENTION

The present invention relates to electrical connectors and, more particularly, to means for protecting electrical connections.

BACKGROUND OF THE INVENTION

"V"-type electrical connections or splices (also referred to as "stub" or "pigtail"-type connections) are often employed for motor connections. Such electrical connections may be exposed to dust, moisture and/or other corrosives. The electrical connections may also be subjected to mechanical impacts and/or vibration. It is, therefore, desirable to protect the connection from the surrounding environment.

One method of protecting an electrical motor connection includes applying a gummy adhesive tape around the connection. Another method includes placing a plastic cap over the connection and securing the cap in place by wrapping an adhesive tape around the cap and connection cables. Yet another method includes placing a plastic cap over the connection and securing the cap in place by inserting a pin through the cap (which may be provided with preformed holes) and between the cables. In each of the latter two methods, a relatively thin layer of grease may be used to facilitate pushing the cap over the connection. It is also known to apply mastic to a connection and wrap or heat shrink a cover over the connection and mastic.

While the foregoing methods provide some protection for V-type electrical connections, improved and more convenient protection is needed.

SUMMARY OF THE INVENTION

According to embodiments of the present invention, a connection protector kit for use with a plurality of electrical stub connections includes a cap defining an opening and having an interior wall defining a cavity. The cavity communicates with the opening. A separator insert defines an insert axis and includes a plurality of holding walls. Each of the holding walls is adapted to hold a respective one of the stub connections. A plurality of axially extending separator walls are interposed between adjacent ones of the holding walls. The cavity is adapted to receive the separator insert and the stub connections.

According to further embodiments of the present invention, a protected electrical connection assembly includes a flexible cap defining an opening and having an interior wall defining a cavity. The cavity communicates with the opening. A separator insert is disposed in the cavity. The separator insert defines an insert axis and includes a plurality of holding walls. A plurality of axially extending separator walls are interposed between adjacent ones of the holding walls. A plurality of electrical stub connections extend through the opening. Each of the holding walls holds a respective one of the stub connections.

According to further embodiments of the present invention, a separator insert for use with a plurality of electrical stub connections is provided. The separator insert defines an insert axis and includes a plurality of holding walls. Each of the holding walls is adapted to hold a respective one of the stub connections. A plurality of axially extending separator walls are interposed between adjacent ones of the holding walls.

According to method embodiments for the present invention, a method of protecting a plurality of electrical stub connections is provided. The method includes providing a separator insert defining an insert axis and including a plurality of axially extending holding walls. Each of the holding walls is adapted to hold a respective one of the stub connections. A plurality of separator walls are interposed between adjacent ones of the holding walls. Each of the stub connections is mounted on a respective one of the holding walls.

Objects of the present invention will be appreciated by those of ordinary skill in the art from a reading of the figures and the detailed description of the preferred embodiments which follow, such description being merely illustrative of the present invention.

DETAILED DESCRIPTION OF THE PREFERRED EMBODIMENTS

Figure 1:
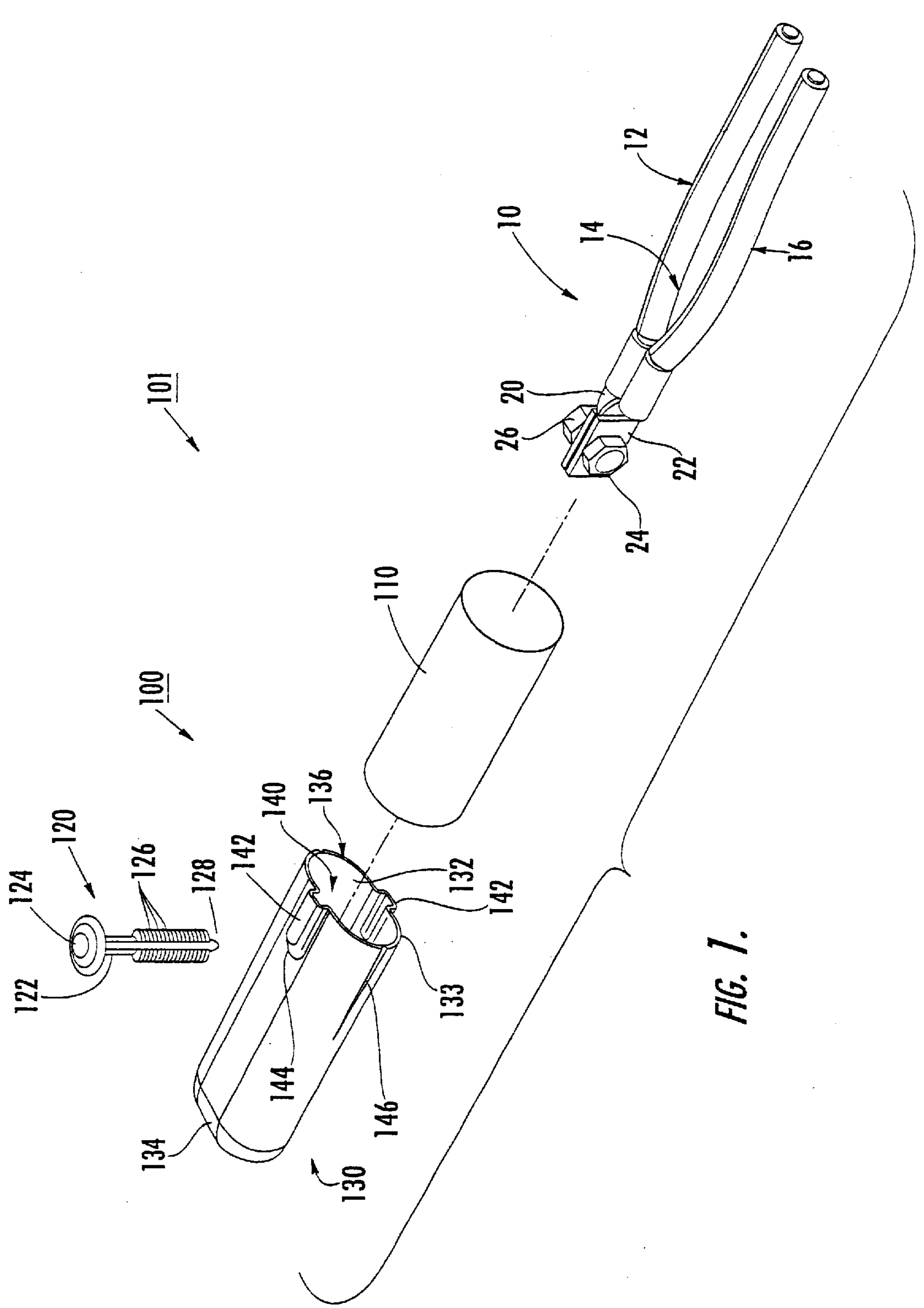
FIG. 1 is an exploded, perspective view of a protected electrical connection assembly according to embodiments of the present invention.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

Figure 2:
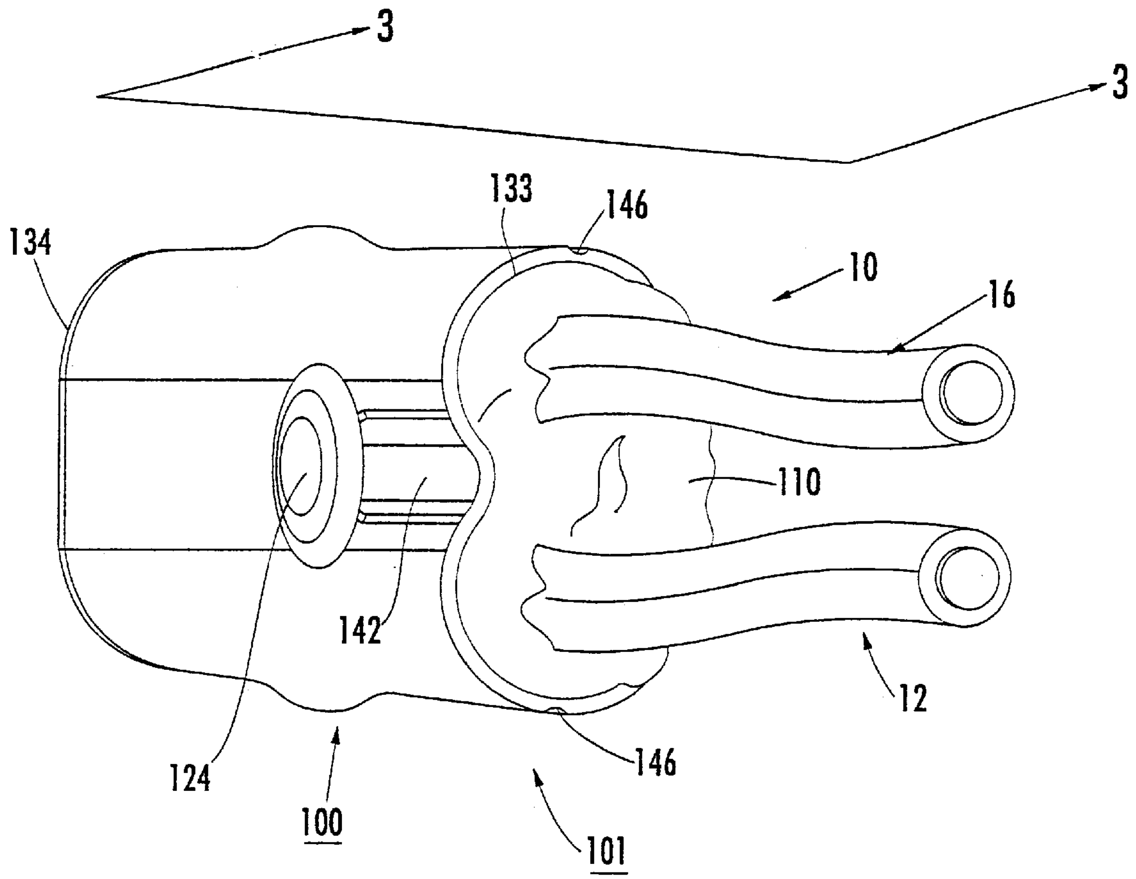
FIG. 2 is a perspective view of the connection assembly of FIG. 1.
Figure 3:
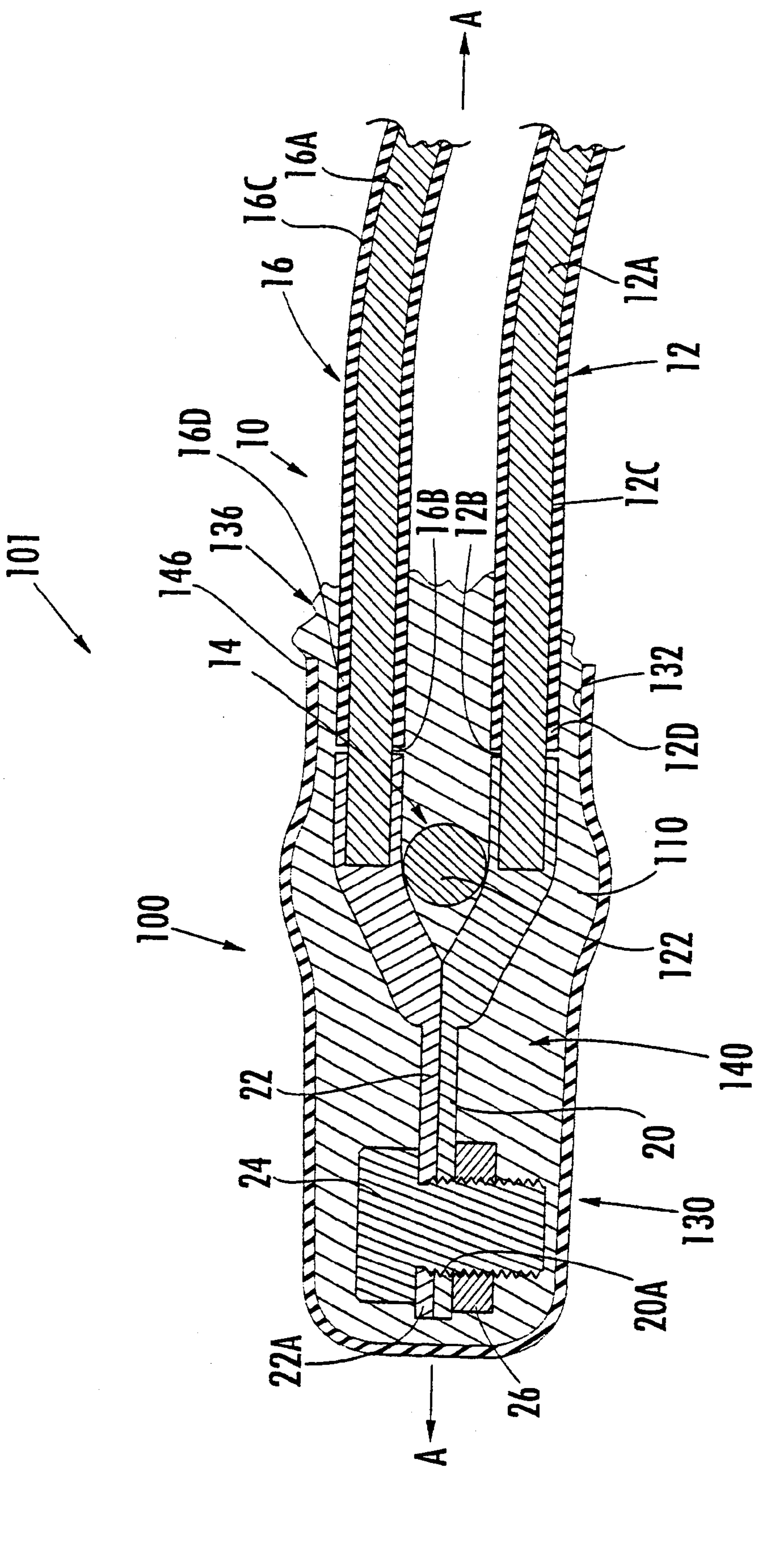
FIG. 3 is a cross-sectional view of the connection assembly of FIG. 1 taken along the line 3—3 of FIG. 2.
Figure 4:
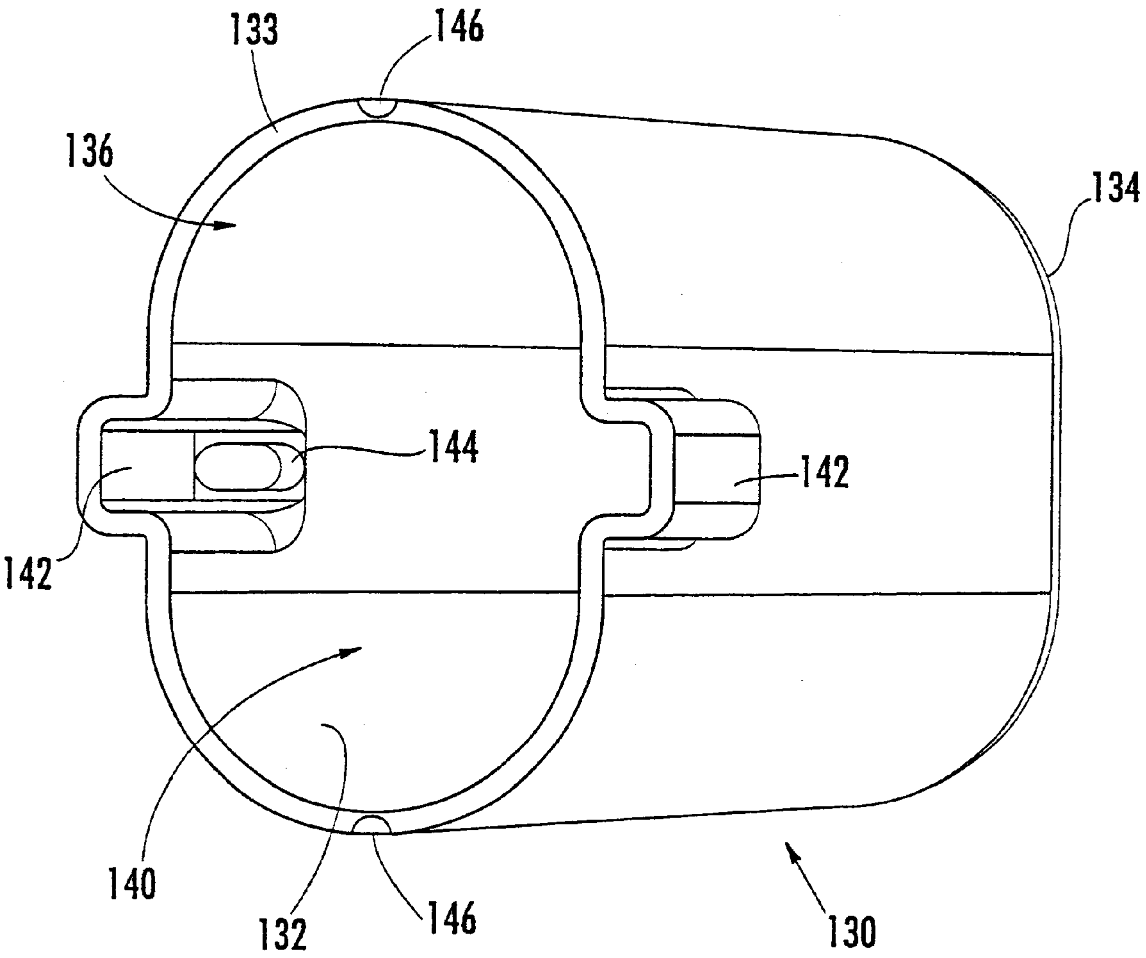
FIG. 4 is a rear perspective view of a cap forming a part of the connection assembly of FIG. 1.
Figure 5:
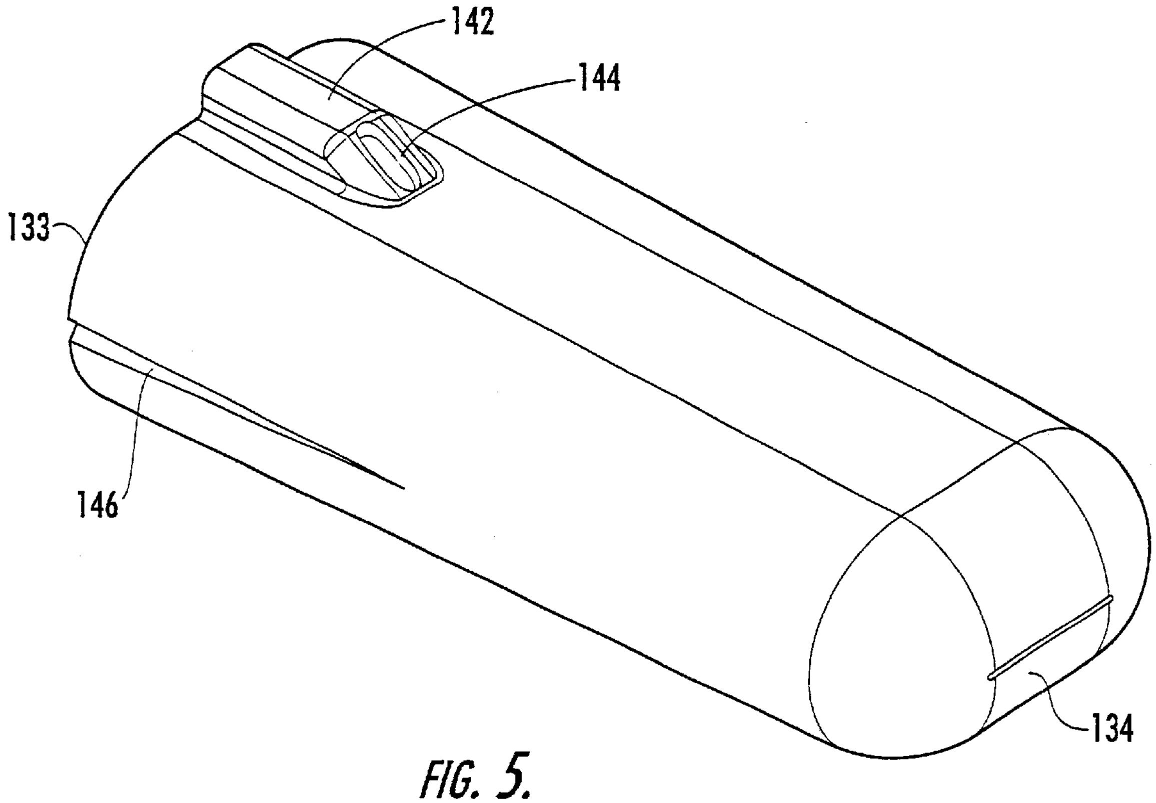
FIG. 5 is a front perspective view of the cap of FIG. 4.

With reference to FIGS. 1–3, an electrical connection kit according to embodiments of the present invention is shown therein and generally designated 100. The kit 100 includes a mass of gel 110, a cap 130 and a pin 120. The kit 100 may be mounted on a V-shaped stub connection 10 to provide a protected electrical connection assembly 101 (see FIGS. 2 and 3). As will be appreciated from the description that follows, in various embodiments the kit 100 may be quickly installed and cold-applied (i.e., installed without requiring heating). The kit 100 may provide a reliable and consistent seal to protect the connection 10 from moisture, dirt, dust, corrosives and other harmful environmental substances. The kit 100 may provide such protection even when the connection assembly 101 is submerged in water or other fluid. Moreover, the kit 100 may serve to dampen vibration to reduce or eliminate any tendency for such vibration to loosen the connection 10. The kit 100 may also electrically and thermally insulate the connection 10 and provide fire retardance.

Turning to the kit 100 in more detail and with reference to FIGS. 1–5, the cap 130 is preferably formed of a molded polymeric material. More preferably, the cap 130 is formed of an elastomer, and most preferably of a thermoplastic elastomer. Suitable materials include SANTOPRENE, a polypropylene/rubber blend, neoprene, silicone or EPDM. However, polyurethane is preferred. Preferably, the cap 130 is formed of a flame retardant material. For example, the polymeric material of the cap 130 may include a suitable additive to make the cap 130 flame retardant. Preferably, the cap material has a durometer of between about 40 Shore A and 90 Shore D, more preferably of between about 70 Shore A and 60 Shore D, and, most preferably, of between about 30 and 50 Shore D. Preferably, the cap has a flexural modulus of between about 5,000 and 100,000 psi, and more preferably of between about 20,000 and 30,000 psi.

For the purposes of discussion, the cap 130 has an axis A—A (see FIG. 3). The cap 130 has an interior surface 132, an open end 133 and an opposing closed end 134. An opening 136 defined in the open end 132 communicates with a cavity 140 defined within the cap 130 by the interior surface 132. Opposed projections 142 extend radially outwardly from the cap and define longitudinally extending interior channels therein. Holes 144 are pre-formed in each of the projections 142. Alternatively, the holes may be punched in the cap after the cap is molded. The projections 142 may be omitted and preferably are omitted where the holes are punched after molding. The holes 144 define a transverse axis extending through each of the holes 144. Generally V-shaped, longitudinally extending grooves 146 are formed in the outer surface of the cap 130 and communicate with the open end edge of the cap 130. Preferably, and as illustrated, the cap is free of openings other than the opening 136 and the holes 144.

The pin 120 is preferably formed of a rigid engineering plastic such as nylon or polypropylene. Preferably, the pin 120 is molded. The pin 120 includes a shaft 122 having a flat head 124 on one end and a tapered head 128 on an opposing end. A series of flexible, opposed barbs 126 extend radially outwardly from the shaft 122 between the heads 124, 128. The heads 124, 128 are sized relative to the holes 144 such that the head 128 may be forced through each hole 144, but thereafter the head 124 and the barbs 126 will each resist removal of the pin through either hole 144.

The term "gel" has been used in the prior art to cover a vast array of materials from greases to thixotropic compositions to fluid-extended polymeric systems. As used herein, "gel" refers to the category of materials which are solids extended by a fluid extender. The gel may be a substantially dilute system that exhibits no steady state flow. As discussed in Ferry, "Viscoelastic Properties of Polymers," 3rd ed. P. 529 (J. Wiley & Sons, New York 1980), a polymer gel may be a cross-linked solution whether linked by chemical bonds or crystallites or some other kind of junction. The absence of the steady state flow may be considered to be the key definition of the solid like properties while the substantial dilution may be necessary to give the relatively low modulus of gels. The solid nature may be achieved by a continuous network structure formed in the material generally through crosslinking the polymer chains through some kind of junction or the creation of domains of associated substituents of various branch chains of the polymer. The crosslinking can be either physical or chemical as long as the crosslink sites may be sustained at the use conditions of the gel.

Preferred gels for use in this invention are silicone (organopolysiloxane) gels, such as the fluid-extended systems taught in U.S. Pat. No. 4,634,207 to Debbaut (hereinafter "Debbaut '207"); U.S. Pat. No. 4,680,233 to Camin et al.; U.S. Pat. No. 4,777,063 to Dubrow et al.; and U.S. Pat. No. 5,079,300 to Dubrow et al. (hereinafter "Dubrow '300"). These fluid-extended silicone gels may be created with nonreactive fluid extenders as in the previously recited patents or with an excess of a reactive liquid, e.g., a vinyl-rich silicone fluid, such that it acts like an extender, as exemplified by the Sylgard® 527 product commercially available from Dow-Corning of Midland, Mich. or as disclosed in U.S. Pat. No. 3,020,260 to Nelson. Because curing is involved in the preparation of these gels, they are sometimes referred to as thermosetting gels. An especially preferred gel is a silicone gel produced from a mixture of divinyl terminated polydimethylsiloxane, tetraks (dimethylsiloxy)silane, a platinum divinyltetramethyldisiloxane complex, commercially available from United Chemical Technologies, Inc. of Bristol, Pa., polydimethylsiloxane, and 1,3,5,7-tetravinyltetramethylcyclotetrasiloxane (reaction inhibitor for providing adequate pot life).

Other types of gels may be used, for example, polyurethane gels as taught in the aforementioned Debbaut '261 and U.S. Pat. No. 5,140,476 Debbaut (hereinafter "Debbaut '476") and gels based on styrene-ethylene butylenestyrene (SEBS) or styrene-ethylene propylene-styrene (SEPSS) extended with an extender oil of naphthenic or nonaromatic or low aramatic content hydrocarbon oil, as described in U.S. Pat. No. 4,369,284 to Chen; U.S. Pat. No. 4,716,183 to Gamarra et al.; and U.S. Pat. No. 4,942,270 to Gamarra. The SEBS and SEPS gels comprise glassy styrenic microphases interconnected by a fluid-extended elastomeric phase. The microphase-separated styrenic domains serve as the junction points in the systems. The SEBS and SEPS gels are examples of thermoplastic systems.

Another class of gels which may be considered are EPDM rubber based gels, as described in U.S. Pat. No. 5,177,143 to Chang et al. However, these gels tend to continue to cure over time and thus may become unacceptably hard with aging.

Yet another class of gels which may be suitable are based on anhydride-containing polymers, as disclosed in WO 96/23007. These gels reportedly have good thermal resistance.

The gel may include a variety of additives, including stabilizers and antioxidants such as hindered phenols (e.g., Irganox™ 1076, commercially available from Ciba-Geigy Corp. of Tarrytown, N.Y.), phosphites (e.g., Irgafos™ 168, commercially available from Ciba-Geigy Corp. of Tarrytown, N.Y.), metal deactivators (e.g., Irganox™ D1024 from Ciba-Geigy Corp. of Tarrytown, N.Y.), and sulfides (e.g., Cyanox LTDP, commercially available from American Cyanamid Co. of Wayne, N.J.), light stabilizers (i.e., Cyasorb UV-531, commercially available from American Cyanamid Co. of Wayne, N.J.), and flame retardants such as halogenated paraffins (e.g., Bromoklor 50, commercially available from Ferro Corp. of Hammond, Ind.) and/or phosphorous containing organic compounds (e.g., Fyrol PCF and Phosflex 390, both commercially available from Akzo Nobel Chemicals Inc. of Dobbs Ferry, N.Y.) and acid scavengers (e.g., DHT-4A, commercially available from Kyowa Chemical Industry Co. Ltd through Mitsui & Co. of Cleveland, Ohio, and hydrotalcite). Other suitable additives include colorants, biocides, tackfiers and the like described in "Additives for Plastics, Edition 1" published by D.A.T.A., Inc. and The International Plastics Selector, Inc., San Diego, Calif.

The hardness, stress relaxation, and tack may be measured using a Texture Technologies Texture Analyzer TA-XT2 commercially available from Texture Technologies Corp. of Scarsdale, N.Y., or like machines, having a five kilogram load cell to measure force, a 5 gram trigger, and ¼ inch (6.35 mm) stainless steel ball probe as described in Dubrow '300, the disclosure of which is incorporated herein by reference in its entirety. For example, for measuring the hardness of a gel a 60 mL glass vial with about 20 grams of gel, or alternately a stack of nine 2 inch×2 inch×⅛" thick slabs of gel, is placed in the Texture Technologies Texture Analyzer and the probe is forced into the gel at the speed of 0.2 mm per sec to a penetration distance of 4.0 mm. The hardness of the gel is the force in grams, as recorded by a computer, required to force the probe at that speed to penetrate or deform the surface of the gel specified for 4.0 mm. Higher numbers signify harder gels. The data from the Texture Analyzer TA-XT2 may be analyzed on an IBM PC or like computer, running Microsystems Ltd, XT.RA Dimension Version 2.3 software.

The tack and stress relaxation are read from the stress curve generated when the XT.RA Dimension version 2.3 software automatically traces the force versus time curve experienced by the load cell when the penetration speed is 2.0 mm/second and the probe is forced into the gel a penetration distance of about 4.0 mm. The probe is held at 4.0 mm penetration for 1 minute and withdrawn at a speed of 2.00 mm/second. The stress relaxation is the ratio of the initial force ($F_i$) resisting the probe at the pre-set penetration depth minus the force resisting the probe ($F_f$) after 1 min divided by the initial force $F_i$, expressed as a percentage. That is, percent stress relaxation is equal to $$\frac{(F_i - F_f)}{F_i} \times 100\%$$

where $F_i$ and $F_f$ are in grams. In other words the stress relaxation is the ratio of the initial force minus the force after 1 minute over the initial force. It may be considered to be a measure of the ability of the gel to relax any induced compression placed on the gel. The tack may be considered to be the amount of force in grams resistance on the probe as it is pulled out of the gel when the probe is withdrawn at a speed of 2.0 mm/second from the preset penetration depth.

An alternative way to characterize the gels is by cone penetration parameters according to ASTM D-217 as proposed in Debbaut '261; Debbaut '207; Debbaut '746; and U.S. Pat. No. 5,357,057 to Debbaut et al., each of which is incorporated herein by reference in its entirety. Cone penetration ("CP") values may range from about 70 ($10^{-1}$ mm) to about 400($10^{-1}$ mm). Harder gels may generally have CP values from about 70($10^{-1}$ mm) to about 120($10^{-1}$ mm). Softer gels may generally have CP values from about 200($10^{-1}$ mm) to about 400($10^{-1}$ mm), with particularly preferred range of from about 250 ($10^{-1}$ mm) to about 375 ($10^{-1}$ mm). For a particular materials system, a relationship between CP and Voland gram hardness can be developed as proposed in U.S. Pat. No. 4,852,646 to Dittmer et al.

Preferably, the gel 110 has a Voland hardness, as measured by a texture analyzer, of between about 5 and 100 grams force, more preferably of between about 5 and 30 grams force, and, most preferably, of between about 10 and 20 grams force. Preferably, the gel 110 has an elongation, as measured by ASTM D-638, of at least 55%, more preferably of at least 100%, and most preferably of at least 1,000%. Preferably, the gel 110 has a stress relaxation of less than 80%, more preferably of less than 50%, and most preferably of less than 35%. The gel has a tack preferably greater than about 1 gram, more preferably greater than about 6 grams, and most preferably between about 10 and 50 grams. Suitable gel materials include POWERGEL sealant gel available from Tyco Electronics Energy Division of Fuqua-Varina, NC under the RAYCHEM brand.

The connection 10 is illustrative of a connection with which the kit 100 may be employed. However, the kit 100 may be used with stub-type connections of other types such as, for example, a crimped stub connection, a mechanical stub connection, or a twisted stub connection. As used herein, "stub connection" means any connection wherein two or more wires or cables are joined at or near their ends to form a generally V-shaped connection.

The connection 10 is illustrative of, for example, a conventional motor connection. The connection 10 as illustrated includes two cables 12, 16. The cables 12, 16 may be replaced with any suitable elongated, electrically conductive elements. Each cable 12, 16 has an elongated electrical conductor 12A, 16A and a surrounding insulator 12C, 16C (see FIG. 3). The cables 12, 16 have respective lugs or connectors 20, 22 secured to their terminal ends. A bolt 24 extends through holes 20A and 22A in the connectors 20, 22 and is secured in place by a cooperating nut 26. The cables 12, 16 define a generally V-shaped crotch 14 therebetween. There may be one or more additional cables secured with the ends of the cables 12, 16, and these additional cables may form further V-shaped crotches with the cable 12, the cable 16 and/or with one another.

With reference to FIGS. 1–3, the kit 100 may be installed on the connection 10 in the following manner. The gel 110 is placed in the cavity 140 of the cap 130. Preferably, the gel is placed fully in the rear of the cavity such that there are substantially no voids in the cavity 140 between the closed end 134 and the surface of the gel adjacent the open end 133. Preferably, the gel 110 is pre-installed (and cured in situ) in the cap 130 so that the user need not place the gel in the cap.

Thereafter, the connection 10 is pushed into the cavity 140 at least until the ; axis extending through the holes 144 extends through the crotch 14 of the connection 10. Preferably, the connection is pushed into the cavity 140 until it bottoms out in the cap's closed end 134. As the connection 10 is inserted, the connection 10 and the interior surface 132 of the cap 130 apply a compressive force to the gel 110. As a result, the gel 110 elongates and is generally deformed to substantially conform to the outer surfaces of the connection 10 and to the interior surface 132. The gel may further elongate such that a portion thereof is displaced toward the cap opening. Some shearing of the gel 110 may occur as well. A portion of the gel 110 may be displaced out of the cap 130. Preferably, at least some of the gel deformation is elastic.

Once the connection 10 is positioned in the cavity as described above, the pin 120 is inserted (tapered end 128 first) through the holes 144 and the crotch 14. The pin 120 is inserted such that one or more of the sets of barbs 126 pass through the far side hole 144. Preferably, the pin is inserted sufficiently far that the cap 130 is partially compressed or collapsed. The grooves 146 may facilitate preferential deformation of the cap 130. In this manner, the user may selectively reduce the volume of the cavity 140 and thereby place the gel 110 under further compressive force. Preferably, this additional compressive force further elongates and elastically deforms the gel 110. The restoring force in the gel 110 resulting from the elastic deformation causes the gel to operate as a spring exerting an outward force between the cap 130 and the connection 10. However, the pin 120 preferably abuts the crotch 14 of the connection 10 and may thereby prevent the gel 110 from relatively displacing the cap 130 and the connection 10. The pin 120 may also maintain the cap in compression as shown in FIG. 2.

With reference to FIG. 3, the volumes, shapes and sizes of the gel 110, the cap 130 and the connection 10 are preferably selected and the kit is preferably installed such that the substantial entirety of the exposed electrically conductive portions i.e., the connectors 20, 22, the exposed portions of the bolt 24, the nut 26 and the uninsulated portions 12B, 16B of the cables 12, 16) of the connection 10 are substantially fully immersed in the gel 110. Preferably, at least the portions 12D, 16D of the cable insulations 12C, 16C immediately adjacent the exposed conductor portions 12B, 16B are substantially completely surrounded by the gel 110. Preferably, the insulator portions 12D, 16D each have a length of at least 0.100 inch. Preferably, when the kit 100 is installed, the gel 110 has a minimum elongation at the interface between the gel 110 and the exposed electrically conductive surfaces of the connection 10 of at least 50%.

Various properties of the gel 110 as described above may ensure that the gel 110 maintains a reliable and long lasting hermetic seal between the cap 130 and the connection 10. The elastic memory of and the retained or restoring force in the elongated, elastically deformed gel 110 generally cause the gel to bear against the mating surfaces of the connection 10 and the interior surface 132 of the cap 130. Also, the tack of the gel may provide adhesion between the gel and these surfaces. The gel, even though it is cold-applied, is generally able to flow about the connection 10 and the cap 130 to accommodate their irregular geometries.

Preferably, the gel 110 is a self-healing or self-amalgumating gel. This characteristic, combined with the aforementioned compressive force between the connection 10 and the cap 130, may allow the gel 110 to re-form into a continuous body if the gel 110 is sheared by the insertion of the connection 10 into the cap 130. The gel may also re-form if the connection 10 is withdrawn from the gel 110.

The kit 100 may provide a number of advantages over many prior art methods for protecting a stub-type electrical connection. The kit 100 may be effectively cold-applied. In its preferred supplied configuration, the kit 100 may be installed by simply inserting the connection 10 into the cap 130, holding the cap 130 in place, and then inserting the pin 120. Hence, the kit 100 may be quickly and consistently installed without requiring special tools, heat or inordinate strength or dexterity, and without mess. The elastic, displaceable gel 110 and the barbs 126 on the pin 120 allow a kit 100 including a cap 130 of a given size to effectively accommodate connections 10 of a range of different sizes and including more or fewer cables 12, 16.

The gel 110 may provide a reliable moisture barrier for the connection 10, even when the assembly 101 is submerged or subjected to extreme temperatures and temperature changes. Preferably, the cap 130 is made from an abrasion resistant material that resists being punctured by the abrasive forces between the motor box and the connection 10.

The gel 110 may also serve to reduce or prevent fire. The gel is typically a more efficient thermal conductor than air and, thereby, may conduct more heat from the connection. In this manner, the gel 110 may reduce the tendency for overheating of the connection 10 that might otherwise tend to deteriorate the cable insulation and cause thermal runaway and ensuing electrical arcing at the connection 10. Moreover, in its preferred form, the gel 110 is flame retardant.

Figure 6:
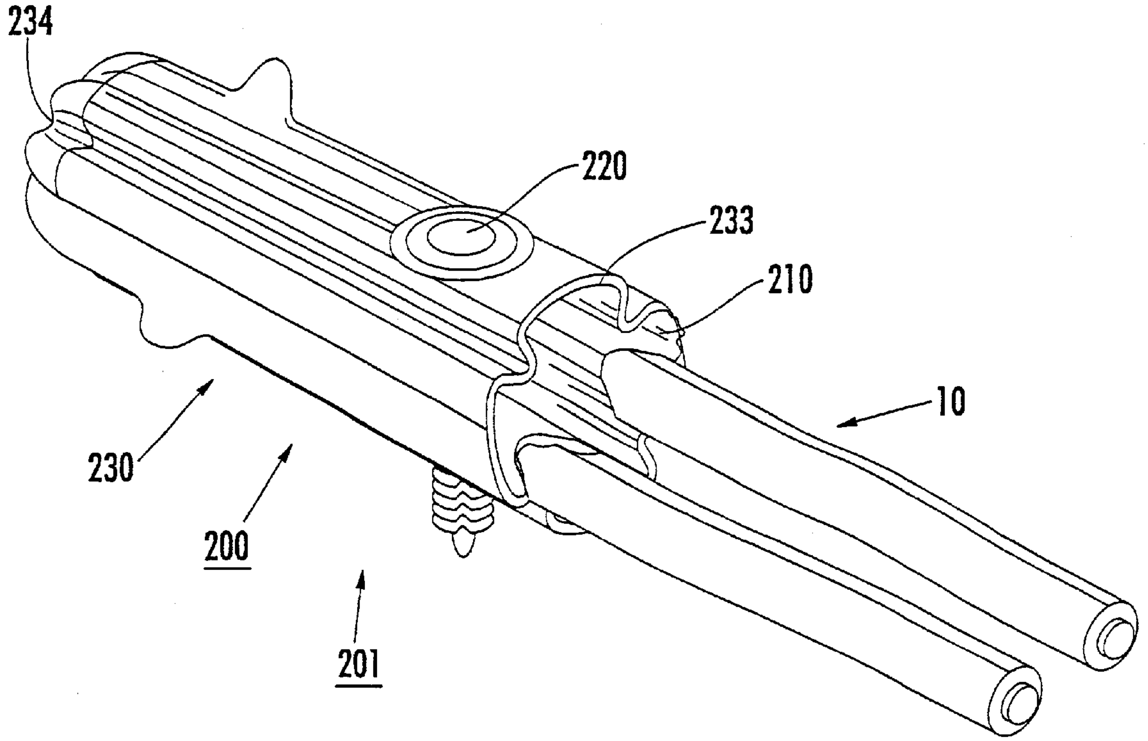
FIG. 6 is a perspective view of a protected electrical connection assembly according to further embodiments of the present invention.

With reference to FIG. 6, an electrical connection protector kit 200 according to further embodiments of the present invention and a protected electrical connection assembly 201 including the kit 200 mounted on the connection 10 are shown therein. The kit 200 generally corresponds to the kit 100.except that the cap 230 of the kit 200 is differently formed from the cap 120.

Figure 7:
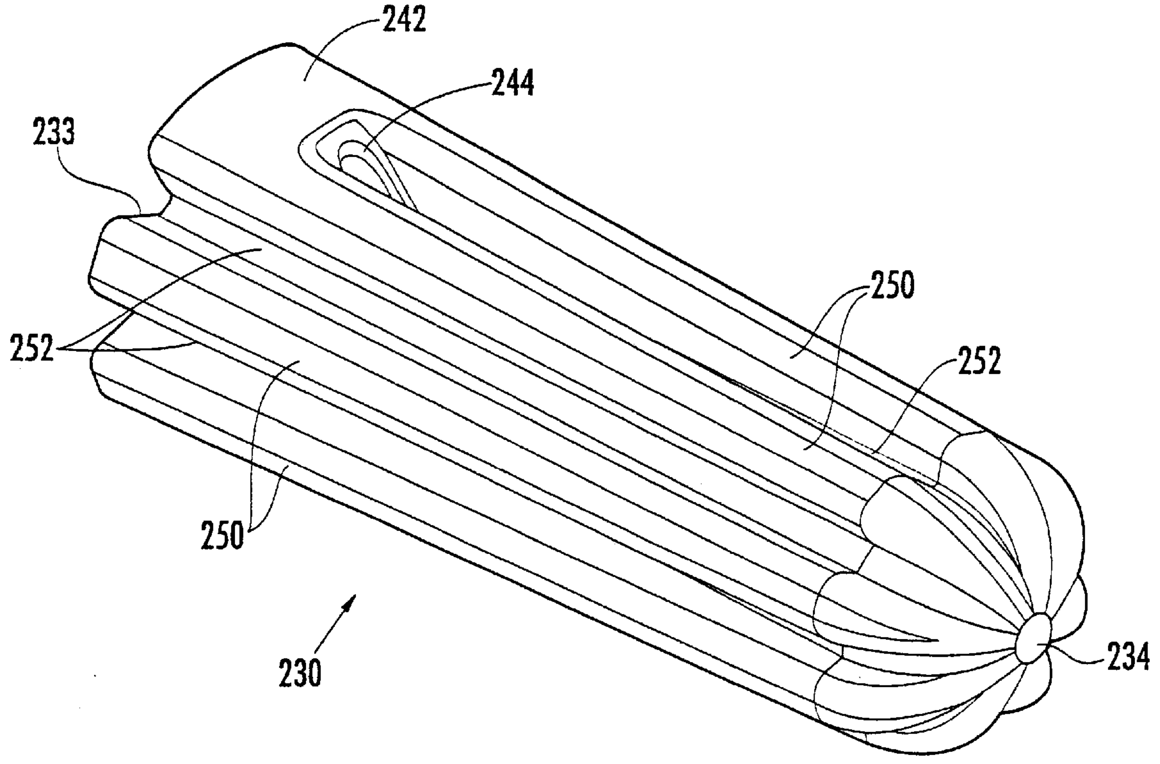
FIG. 7 is a front perspective view of a cap forming a part of the connection assembly of FIG. 6.
Figure 8:
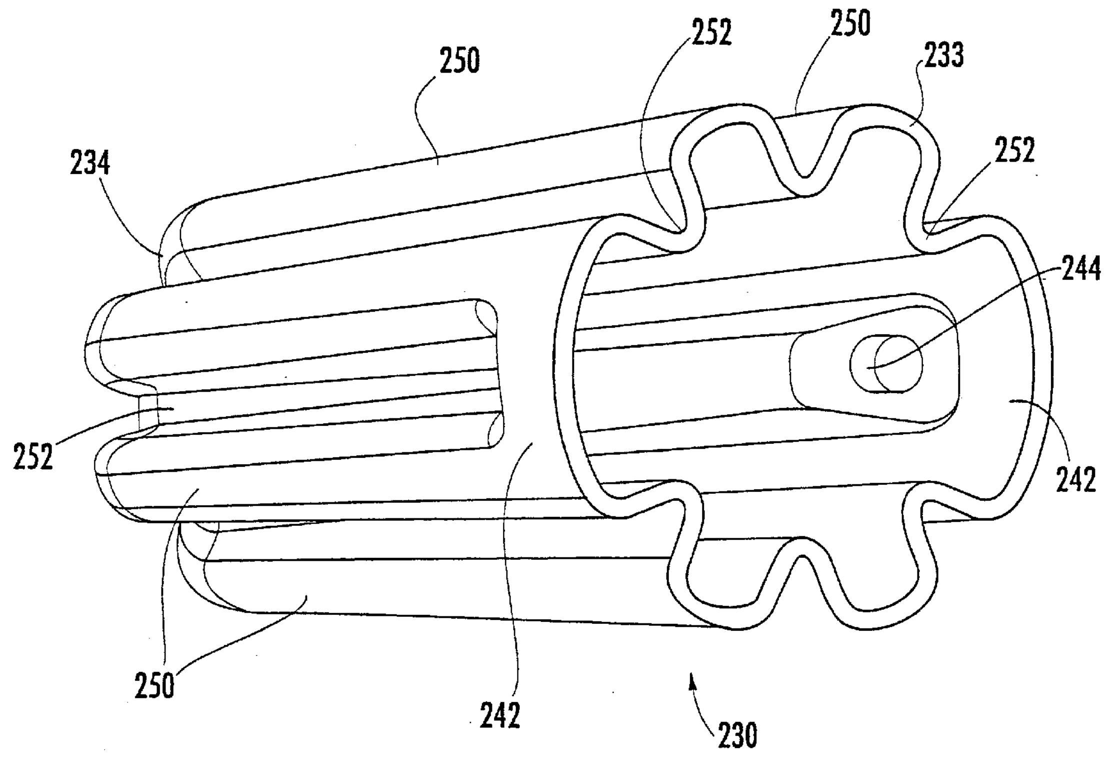
FIG. 8 is a rear perspective view of the cap of FIG. 7.

The cap 230 is preferably formed in the same manner and of the same materials as the cap 130 except as follows. As best seen in FIGS. 7 and 8, the cap 230 includes a plurality of radially outwardly extending corrugations 250 and a plurality of radially inwardly extending corrugations 252 alternating with the corrugations 250 to present a zig-zagged cross-section. Preferably, each of the corrugations 250, 252 extends longitudinally from the open end 233 to the closed end 234 as illustrated. Projections 242 and holes 244 are provided adjacent the open end 233.

The kit 200 may be used in a similar manner as the kit 100. The modulus of elasticity of the cap material, the configuration of the cap 230 and the stress relaxation of the gel 210 are preferably relatively selected such that, upon application of a force to the gel 210 (e.g., by inserting the connection 10) up to a prescribed force, substantially all of the force will be accommodated by elongation and elastic deformation of the gel 210. Upon application of additional force to the gel 210 (e.g., by further inserting the connection 10 and/or compressing the cap 230 with the pin 220), the cap 230 will also flex and, upon application of sufficient additional force, the cap material will stretch.

The kit 200 generally may provide the same advantages as described above with regard to the kit 100. Additionally, the kit 200 may accommodate connections 10 of a greater range of different sizes while also minimizing the size of the connection assembly 201. The corrugations 250, 252 may allow the cap 230 to expand as needed to accommodate larger connections 10 and larger numbers of cables 12, 16 so that the volume of the installed cap 230 is proportional to the size of the connection 10. In this manner, the space required for the assembly 201 may be minimized. This may provide a particular advantage where the connection 10 is to be housed in a motor connection box where space may be limited.

The gel 210 will typically have a substantially greater coefficient of thermal expansion than the material of the cap 230. In use, the connector assembly 201 may experience regular heat cycling as well as extreme temperature excursions. For a given rise in temperature, a portion of the gel's volumetric expansion will be expected to result in additional elongation. However, the gel 210 may also exert an outward force on the cap 230. The corrugations 250, 252 may flex to expand outwardly and thereby accommodate this force. The cap material may also stretch. If the temperature is subsequently lowered, the gel 210 will volumetrically contract. The flexural memory of the cap material will allow the corrugations, and thus the cap, to recover and reduce the interior volume of the cap. If the cap was also stretched by the earlier gel expansion, the elastic memory of the cap material may also allow the cap to recover. In this manner, the creation of gaps between the outer surface of the gel and the interior surface of the cap as a result of temperature fluctuations may be minimized or prevented.

Preferably, the material of the cap 230 has a durometer and a flexural modulus as described above with regard to the cap 130. Preferably, the corrugations 250, 252 are arranged and configured to allow for a maximum expansion of the outer diameter of the cap 230 of at least 10%, and preferably of between about 50% and 150%. It will be appreciated that corrugations of other shapes and relative configurations may be employed.

Figure 9:
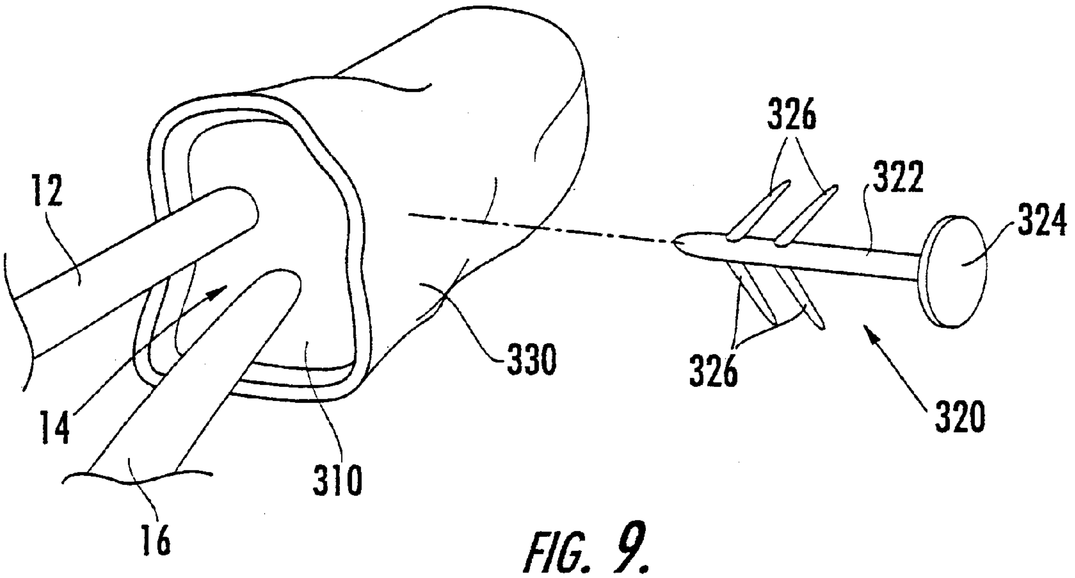
FIG. 9 is a perspective view of a protected electrical connection assembly according to further embodiments of the present invention.
Figure 10:
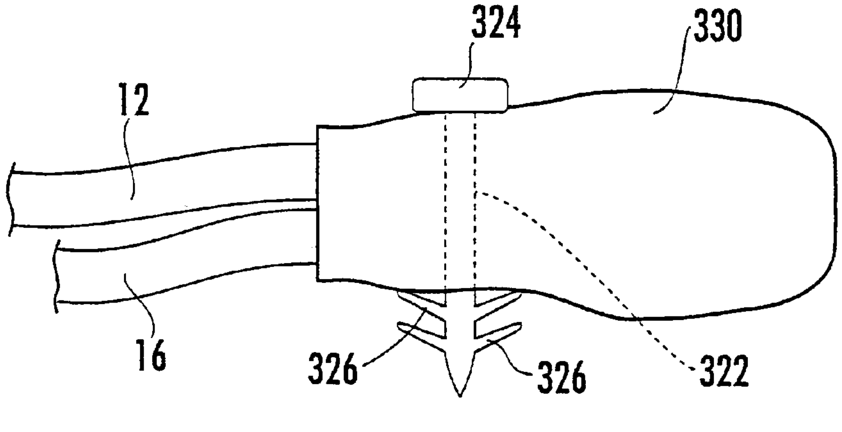
FIG. 10 is a side elevational view of the connection assembly of FIG. 9.

With reference to FIGS. 9 and 10, an electrical connection protector kit 300 according to further embodiments of the present invention and a protected electrical connection assembly 301 including the kit 300 mounted on the connection 10 are shown therein. The kit 300 corresponds to the kit 100 except that the cap 330 thereof is formed of a frangible material and no preformed holes corresponding to the holes 144 are provided. The frangible material is preferably a thermoplastic elastomer having a tensile strength of between about 1,000 and 3,000 psi.

The kit 300 may be installed in substantially the same manner as the kit 100, except as follows. After the connection 10 is inserted into the gel 310 and the cap 330, the user locates the crotch 14 of the connection 10. The user then presses the pin 320 through the frangible cap 330, through the crotch 14, and then through the opposite side of the cap 330. The pin 320 is retained in place, with the shaft 322 positioned in the connection crotch 14, by the head 324 and the barbs 326. In this manner, the cap 330 may be secured on the connection 10 and a compressive force may be applied to the gel 310 as discussed above with regard to the kit 100.

While the foregoing kits preferably employ pins 120, 220, 320 as shown, the caps thereof may also be retained and compressed using other suitable means. For example, the pins may be replaced by or supplemented with a tape wrap, a clamp ring, or a clip. Also, the caps 130, 230, 330 may be formed of a heat shrinkable thermoplastic elastomer and heated after the connection 10 has been inserted. In the embodiments using pins, a series of pairs of opposed holes may be provided along the length of the cap so that the pin may be inserted through a selected pair of holes at a preferred location, depending on the location of the connection crotch 14. The illustrated, barbed pins may be replaced with threaded pins (e.g., bolts or screws) and complementary threaded nuts.

As noted above, the gel 110, 210 is preferably cured in situ. With the cap oriented vertically with the open end up, the liquid, uncured gel may be dispensed into the cavity of the molded cap 130, 230 and thereafter cured. Preferably, thin skins of the elastomeric cap material cover the holes 144, 244 to prevent seepage of the uncured gel and also to minimize expulsion of the cured gel through the holes 144, 244 when the connection 10 is inserted during installation. Preferential tear or score lines may be provided in the skins.

Figure 11:
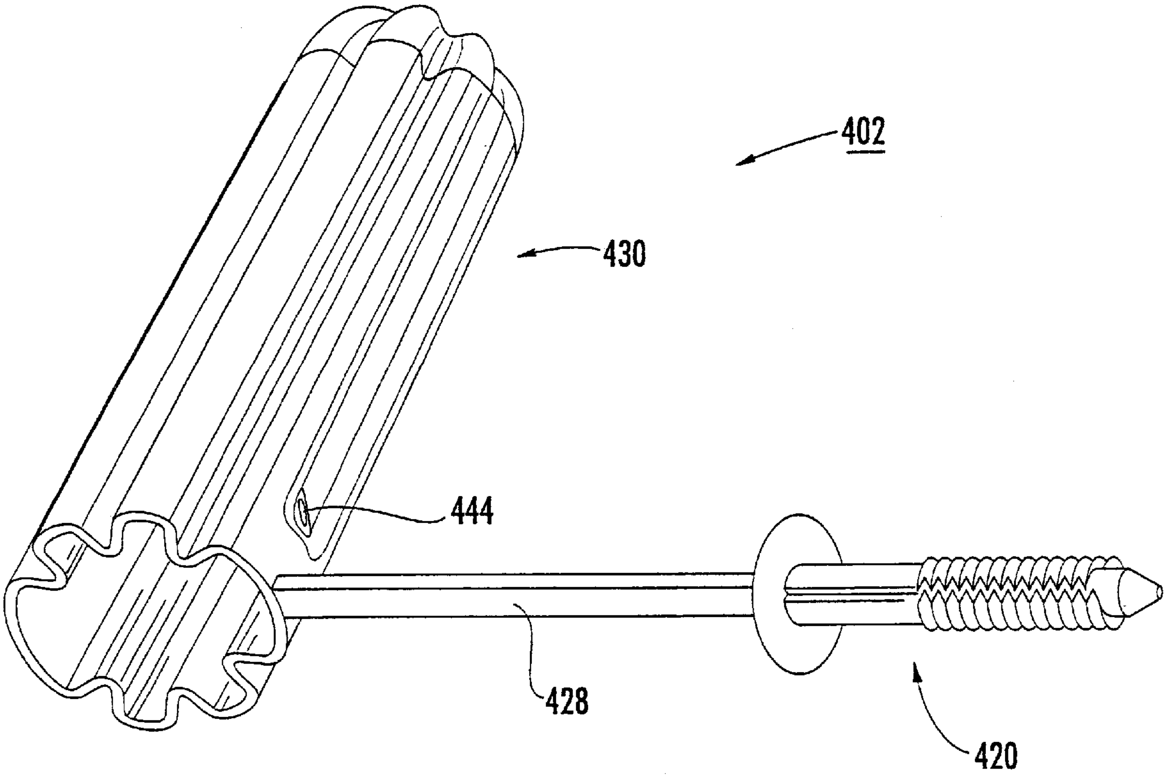
FIG. 11 is a perspective view of a cap/pin assembly according to further embodiments of the present invention.

With reference to FIG. 11, a cap/pin assembly 402 according to further embodiments is shown therein. The assembly 402 includes a cap 430 generally corresponding to the cap 130 and a pin 420 generally corresponding to the pin 120. A flexible bridge member 428 joins the pin 420 to the cap 430. Preferably, the cap 430, the pin 420 and the bridge member 428 are integrally molded and formed of the same material as described above with regard to the cap 130. The assembly 402 may be used in a connection protector kit otherwise corresponding to the kit 100 or the kit 200, for example. In use, the user may bend the bridge member 428 to insert the pin through the holes 444 of the cap 430. In this manner, the number of loose pieces in the kit are reduced.

With reference to FIGS. 12–17, an electrical connection protector kit 500 according to further embodiments of the present invention and a protected electrical connection assembly 501 including the kit 500 mounted on the connection 10 are shown therein. The kit 500 generally corresponds to the kit 200 except that the kit 500 is secured using a clamp 560 and no pin corresponding to the pin 220 is provided. The kit 500 includes a cap 530 having outwardly extending corrugations 550 and inwardly extending corrugations or channels 552. A gel 510 corresponding to the gel 110 is provided in the cap 530.

The clamp 560 is preferably molded or extruded from a flexible, stretch resistant polymeric material such as polypropylene. The clamp 560 includes first and second opposed walls or legs 562, 563 which are joined along a connecting portion 564. The widths W of the walls 562, 563 and the connecting portion 564 are selected to provide the desired amount of displacement of the gel 510 when the clamp is mounted and closed, as discussed in more detail below. The walls 562, 563 and the connecting portion 564 define a cavity 566. Opposed locating projections or ribs 565 are integrally formed with and extend inwardly from the inner surfaces of the walls 562, 563 into the cavity 566. Barbed latching structures 567, 568 are formed on the free ends of the walls 562, 563. A closure projection or rib 567A extends outwardly from the wall 562. Each of the locating ribs 565 and closure rib 567A may be replaced with projections of other configurations; however, the laterally extending ribs as shown are preferred.

The nominal thickness D of the connecting portion 546 is preferably selected such that the walls 562, 563 may be pulled apart far enough to allow the clamp 560 to be wrapped about the cap 530, the gel 510 and the connection 10 but the connecting portion 564 will not stretch or break under a prescribed load corresponding to the anticipated load.

Figure 12:
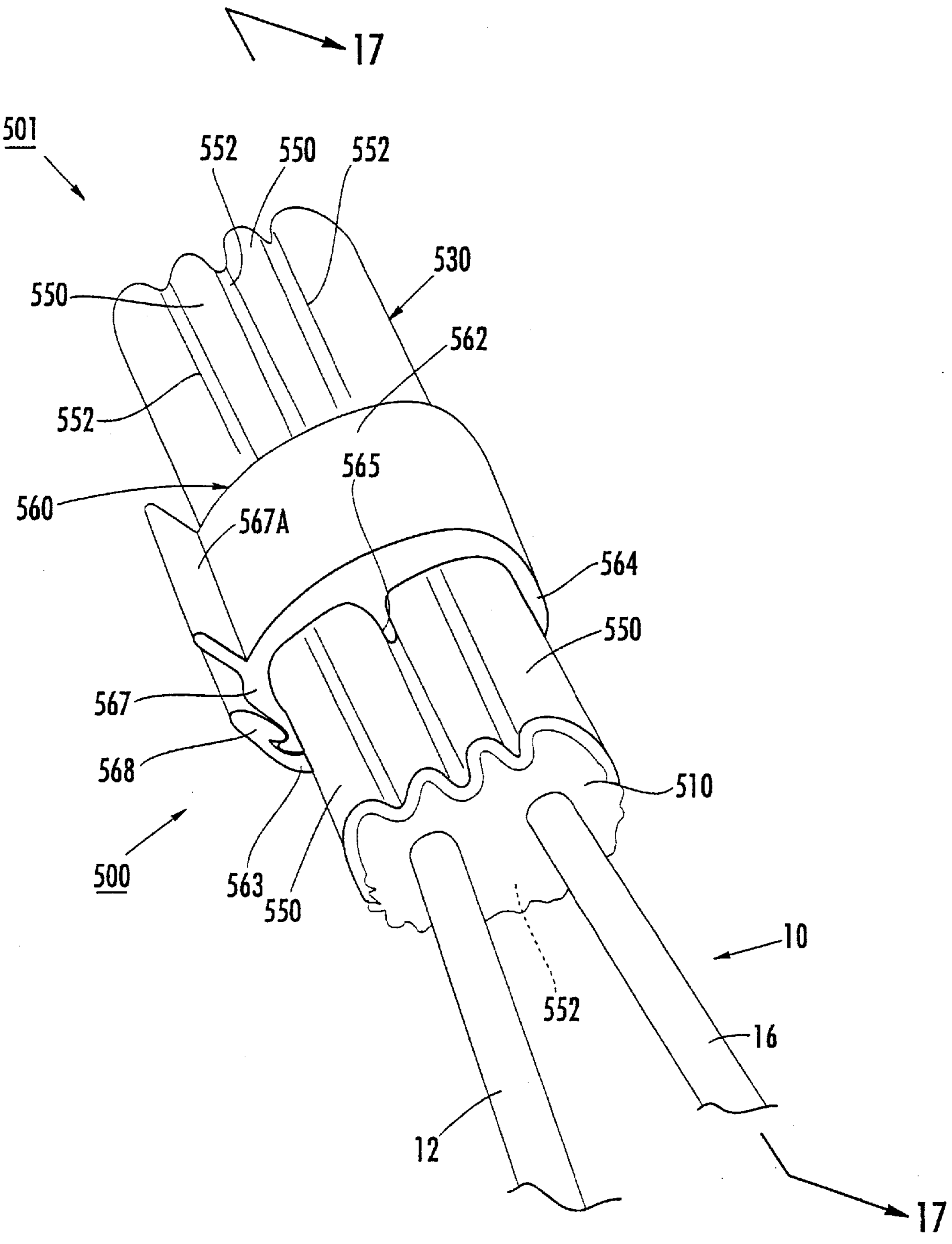
FIG. 12 is a perspective view of a protected electrical connection assembly according to further embodiments of the present invention.
Figure 13:
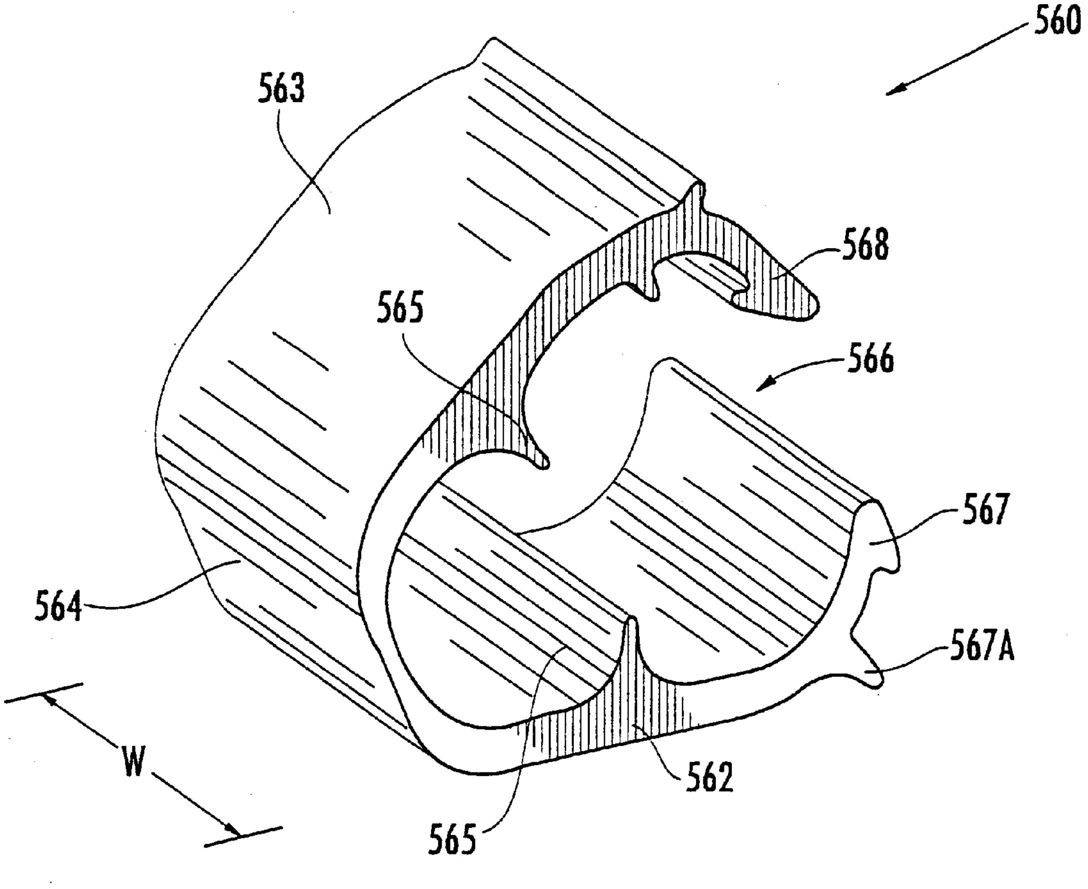
FIG. 13 is a perspective view of a clamp forming a part of the connection assembly of FIG. 12.
Figure 14:
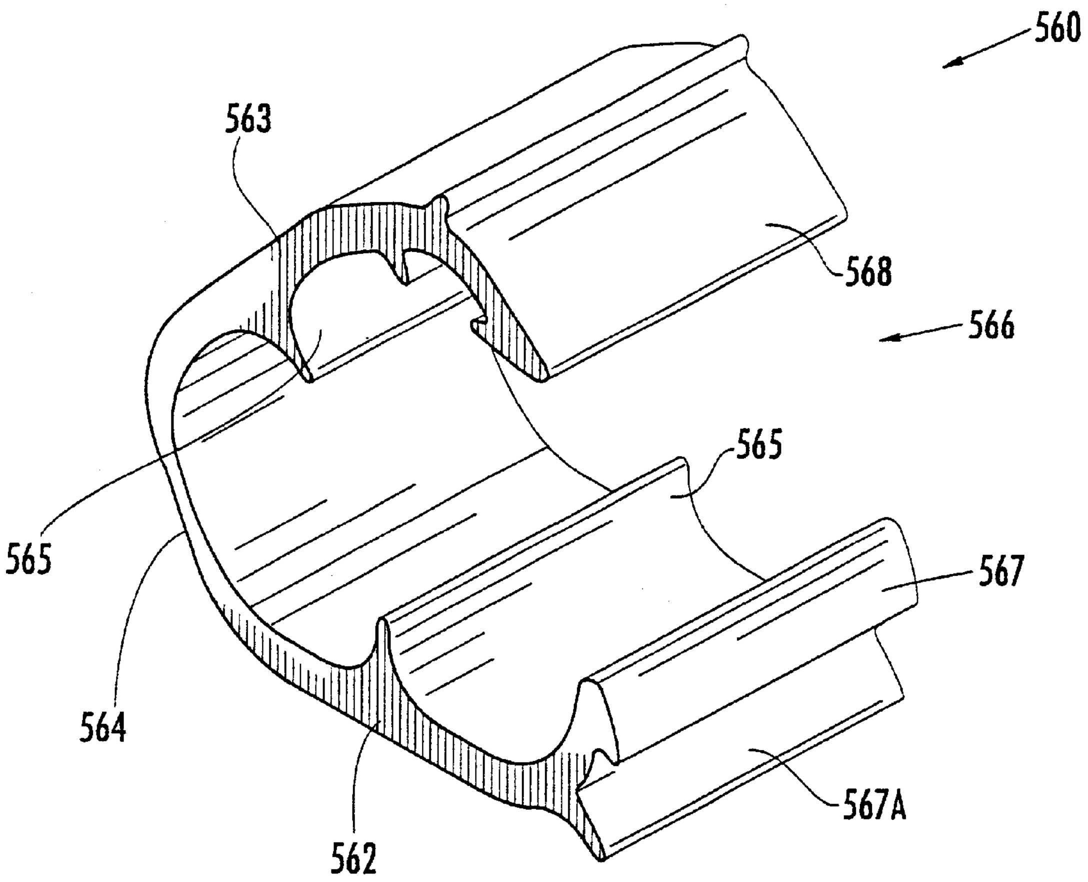
FIG. 14 is a further perspective view of the clamp of FIG. 13.
Figure 15:
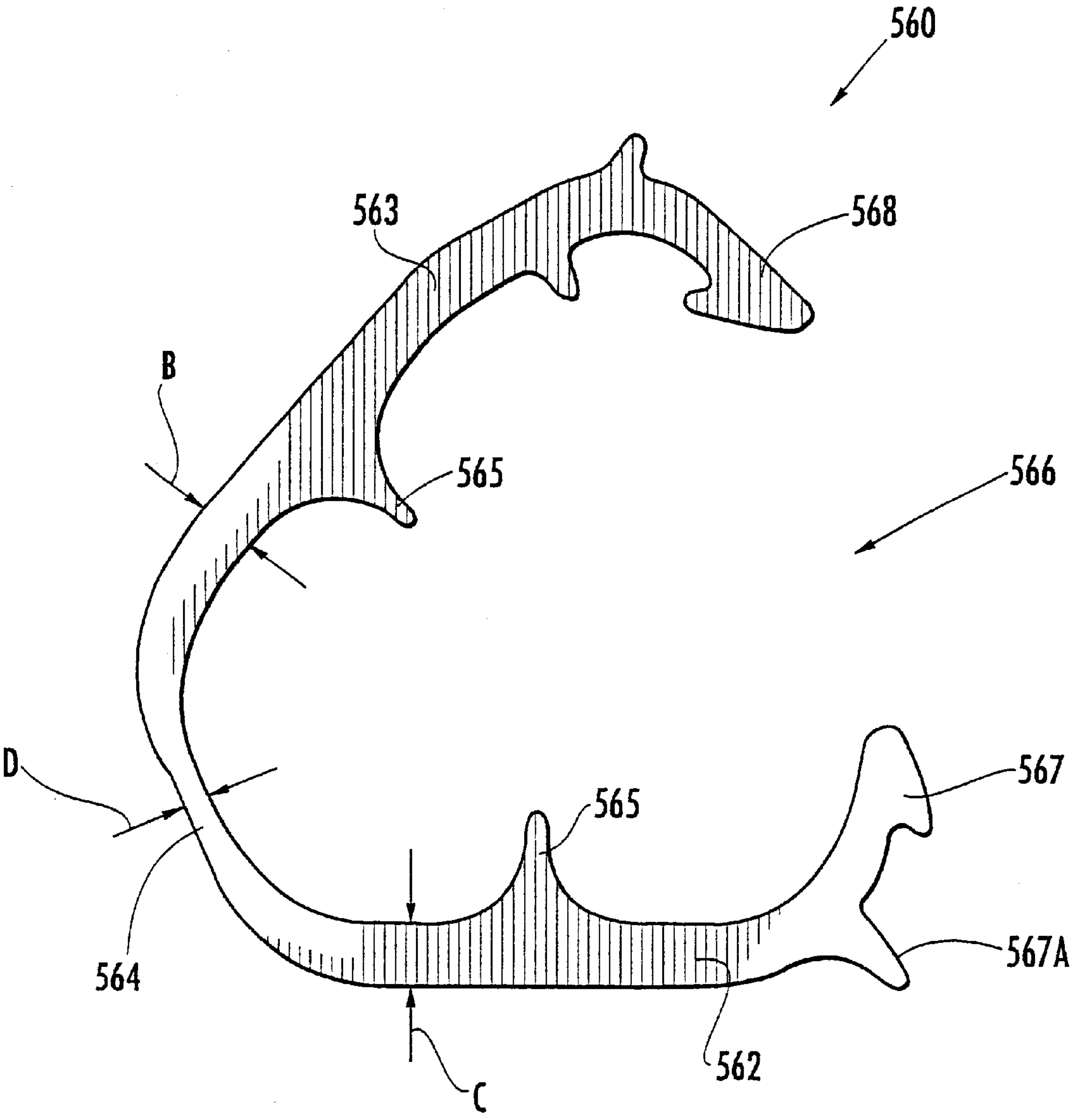
FIG. 15 is a side elevational view of the clamp of FIG. 13.
Figure 16:
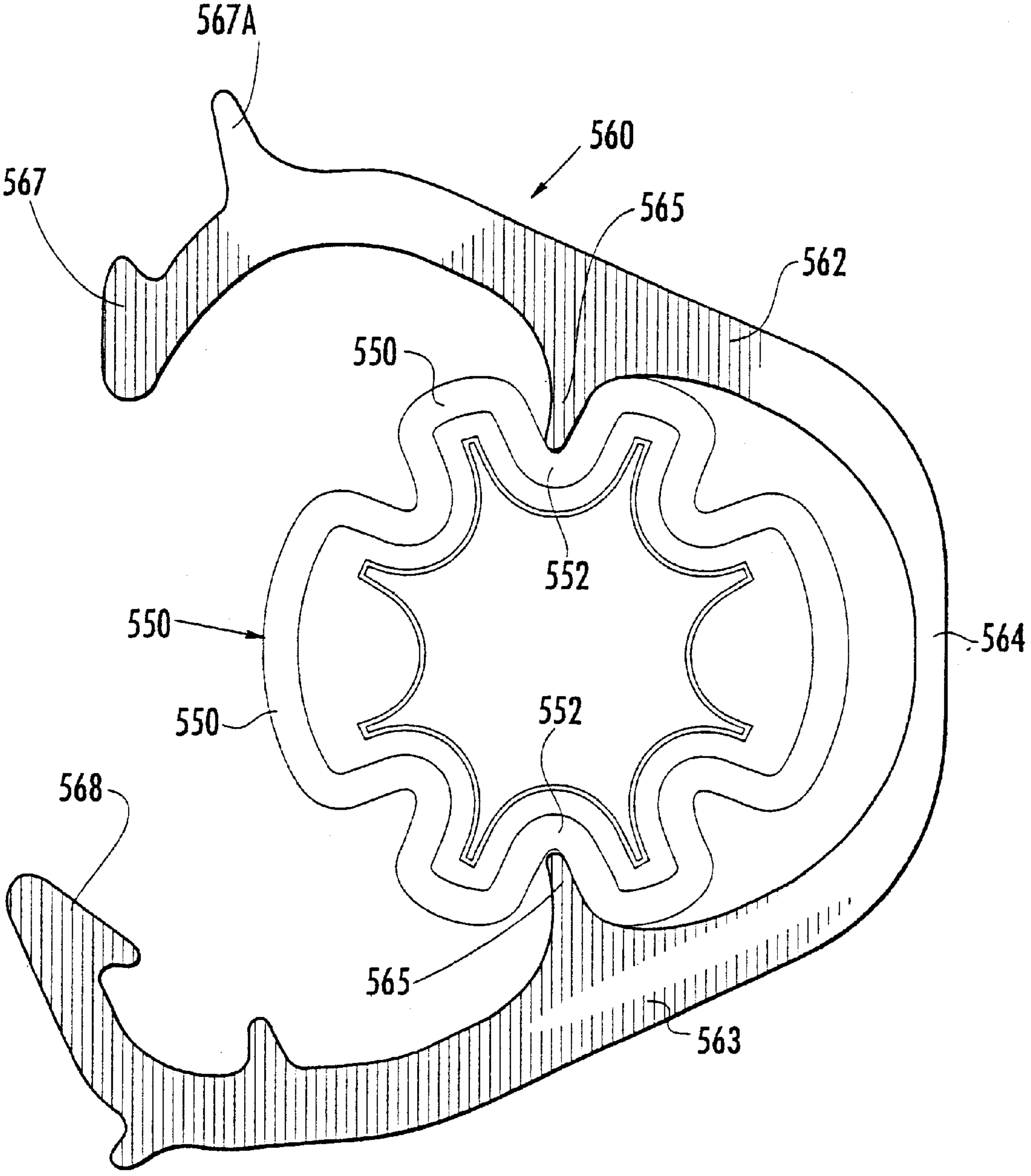
FIG. 16 is an end view of the clamp and a cap forming a part of the connection assembly of FIG. 12.
Figure 17:
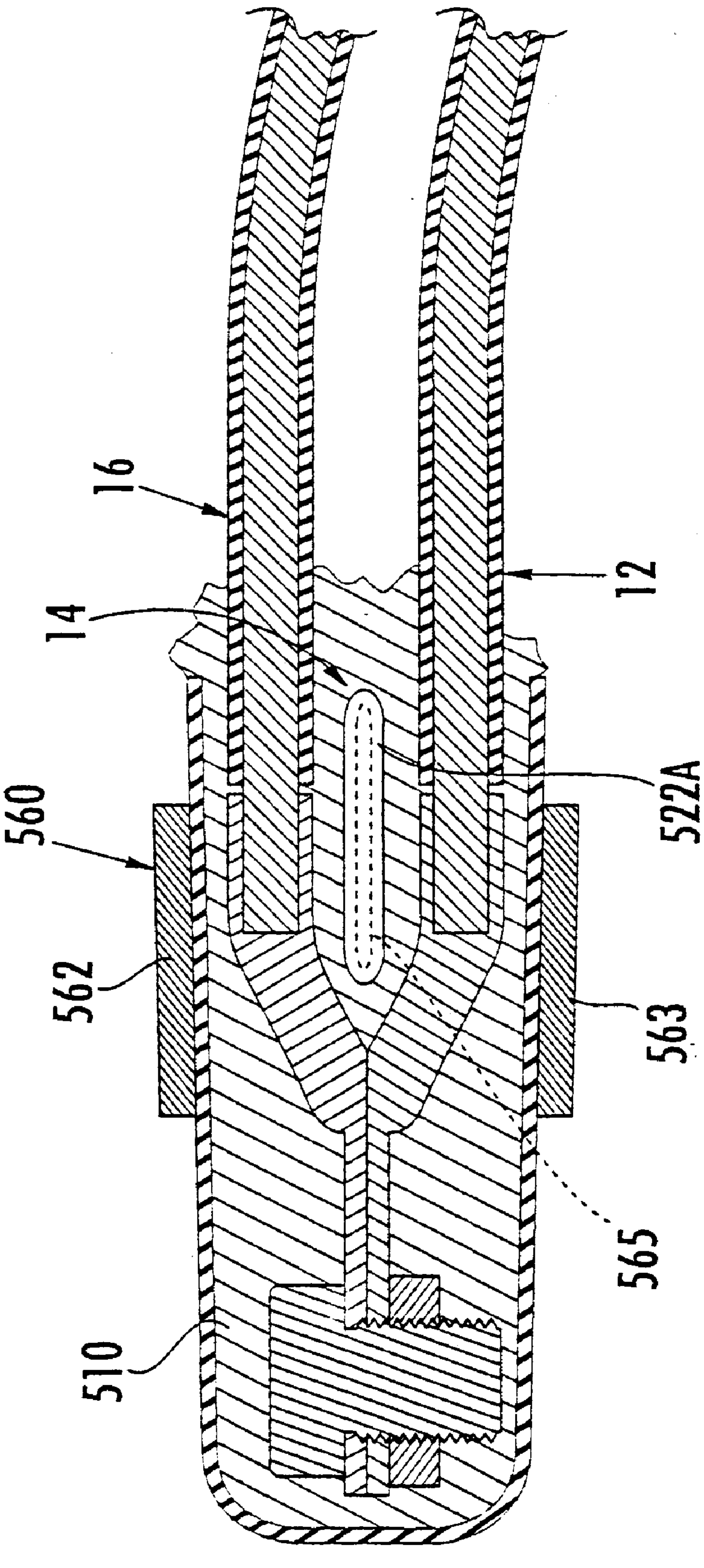
FIG. 17 is a cross-sectional view of the connection assembly of FIG. 12 taken along the line 17—17 of FIG. 12.

The kit 500 may be used in the following manner. The connection 10 and the gel 510 are installed in the cap 530 in the same manner as described above with regard to the gel 210 and the cap 230. The clamp 560 is opened and wrapped about the cap 530 as shown in FIG. 16 (wherein the gel and connection are omitted for clarity) such that the ribs 565 are located in opposed inwardly extending corrugations 552 and in or adjacent the crotch 14. The clamp 560 is then compressed to close the clamp 560 about the cap 530 and to interlock the latch structures 567, 568 as shown in FIGS. 12 and 17. This action is facilitated by the rib 567A. The rib 567A also serves to protect the latch structures 567, 568 from unintentional disengagement.

As the clamp 560 is compressed into the closed position, the ribs 565 force the corrugations 552 inwardly into the crotch 14, thereby deforming the cap 530 and displacing a portion of the gel 510. The cap 530 may be deformed such that the opposed corrugations 552 fully displace the interposed gel 510 and make contact as shown in FIG. 17, or may be displaced by a lesser amount. However, upon closure of the clamp 560, portions of the opposed corrugations 552 are preferably disposed within the crotch 14 to prevent or resist withdrawal of the connection 10 from the cap 530. Additionally, the ribs 565, the walls 562, 563 and the connecting portion 564 apply a compressive force to the gel 510 as discussed above with regard to the kit 100.

Figure 18:
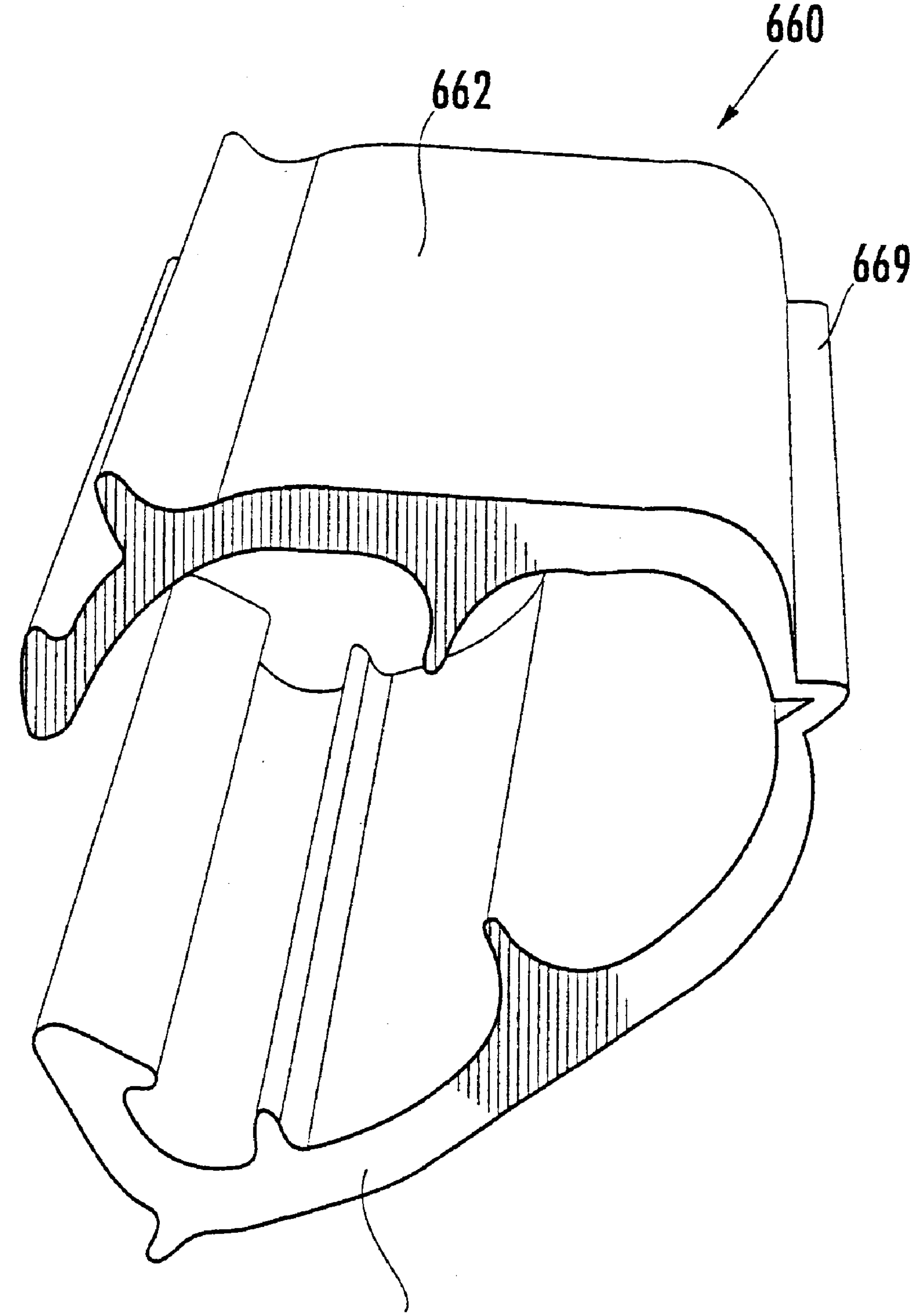
FIG. 18 is a perspective view of a clamp according to further embodiments of the present invention.
Figure 19:
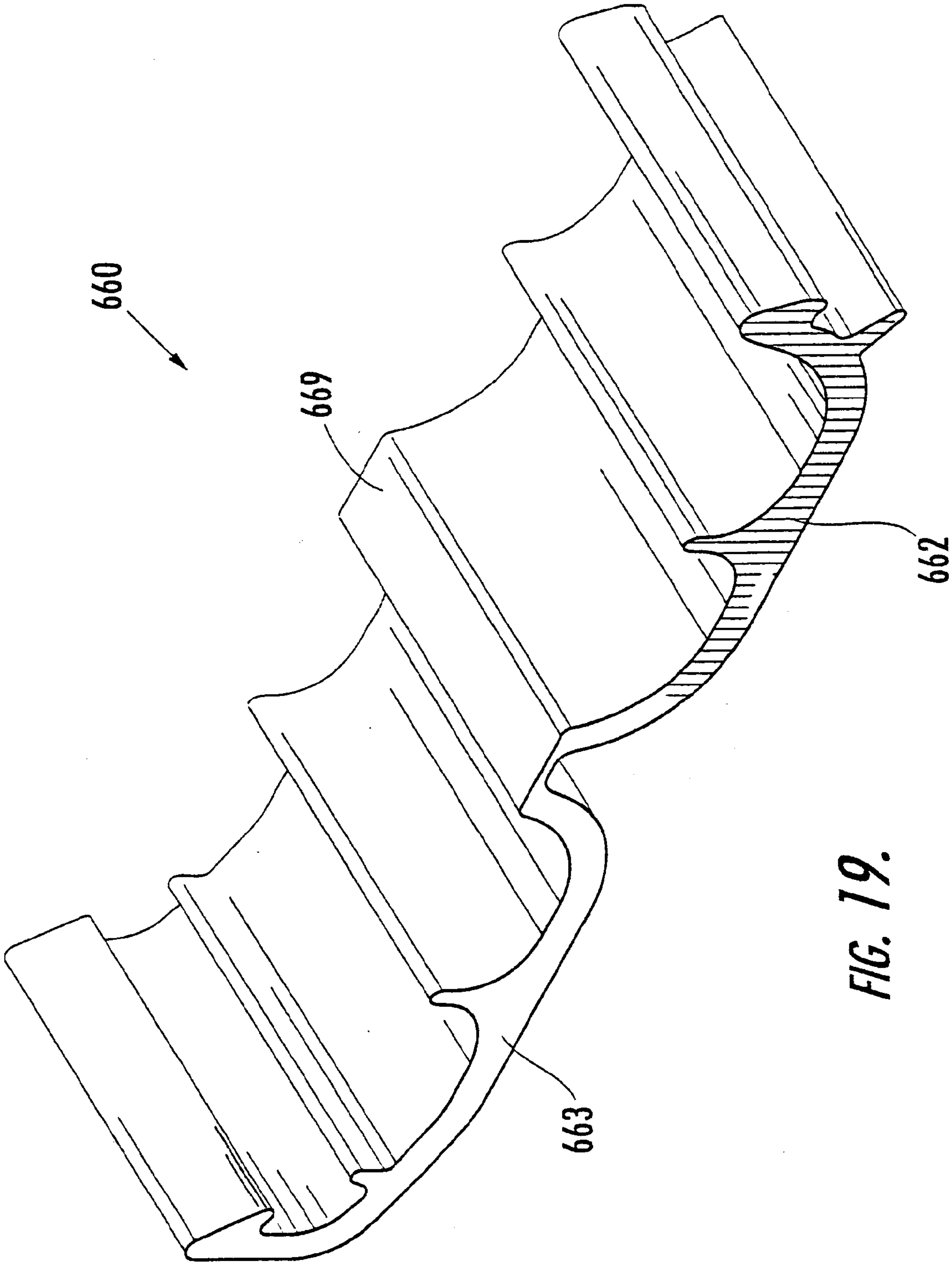
FIG. 19 is a perspective view of the clamp of FIG. 18 in a fully open position.
Figure 20:
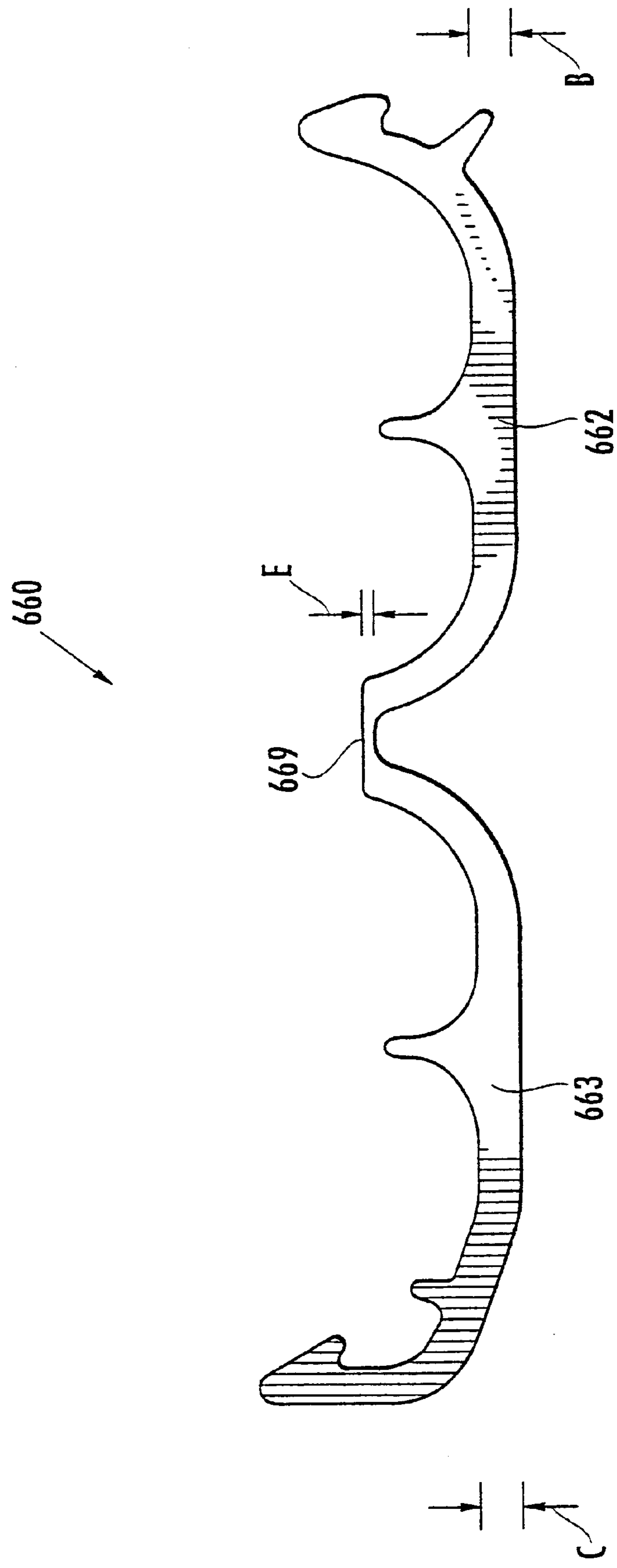
FIG. 20 is a side elevational view of the clamp of FIG. 18 in the fully open position.

With reference to FIGS. 18–20, a clamp 660 according to further embodiments of the present invention is shown therein. The clamp 660 may be used in kits and in the same manner as described above with regard to the clamp 560. The clamp 660 generally corresponds to the clamp 560 except that the clamp 660 includes a living hinge 669 joining the walls 662, 663 in place of the connecting portion 564. The living hinge 669 has a substantially reduced nominal thickness E as compared to the nominal thicknesses B and C of the walls 662, 663. Preferably, the living hinge 669 can be flexed through an angle of at least 180 degrees without breaking or significant plastic deformation.

Figure 22:
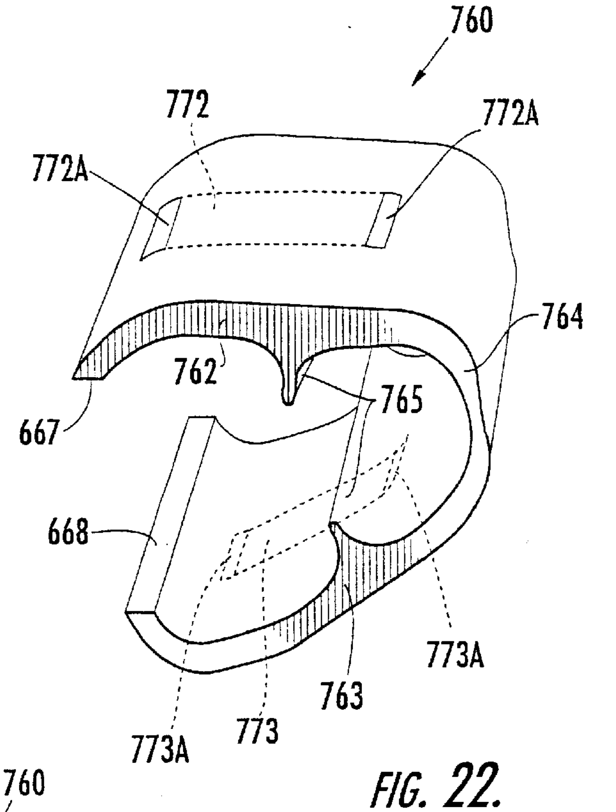
FIG. 22 is a perspective view of a clamp forming a part of the connection assembly of FIG. 21.
Figure 21:
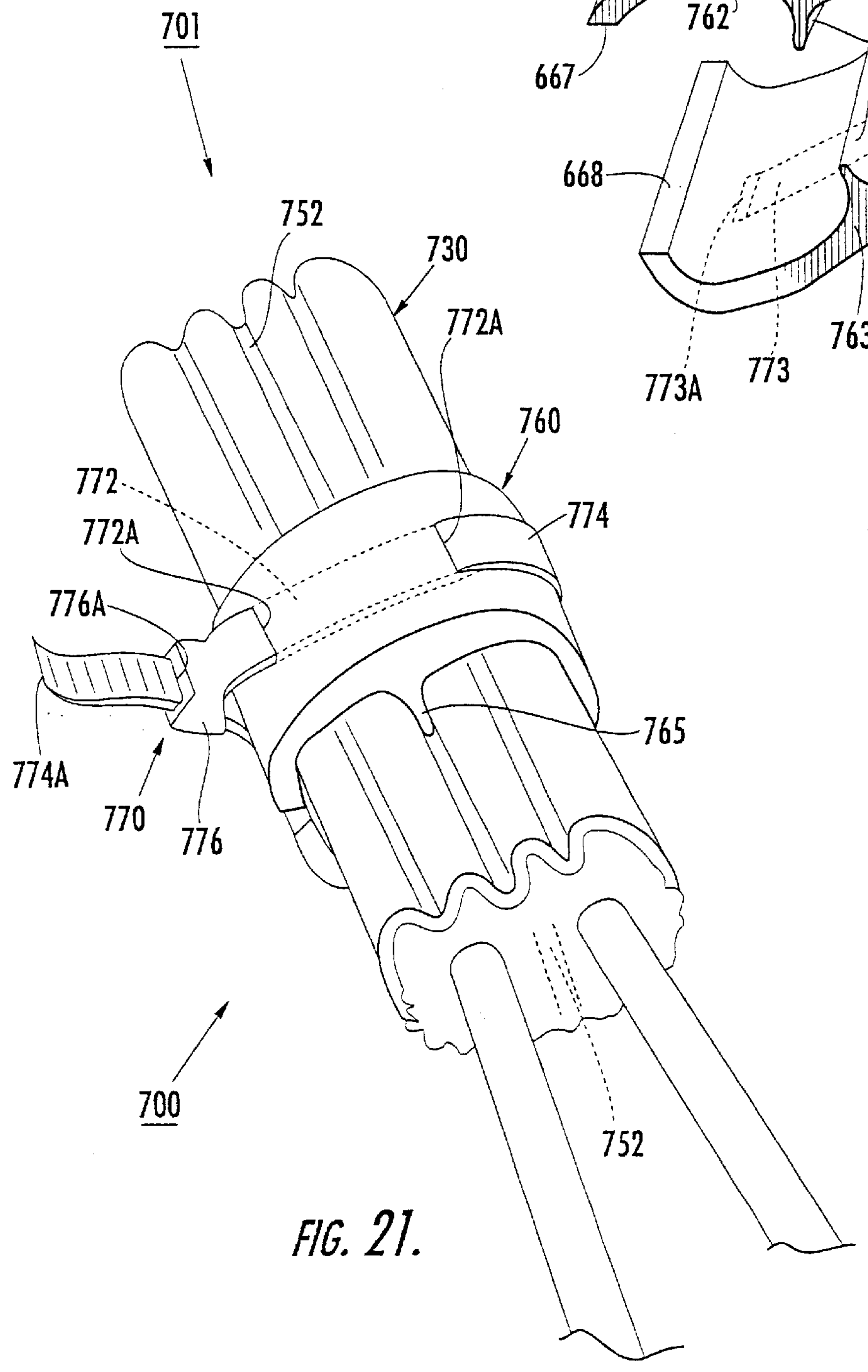
FIG. 21 is a perspective view of a protected electrical connection assembly according to further embodiments of the present invention.

With reference to FIGS. 21 and 22, an electrical connection protector kit 700 according to further embodiments of the present invention and a protected electrical connection assembly 701 including the kit 700 mounted on the connection 10 are shown therein. The kit 700 generally corresponds to the kit 500 except that the kit 700 is secured using a clamp 760 and a tie wrap 770 in place of the clamp 560.

The clamp 760 has passages 772, 773 extending through the walls 762 and 763 and communicating with opposed openings 772A and 773A. As shown, the free edges 767, 768 are plain, but, alternatively, may be provided with latching structures corresponding to the latching structures 567, 568, for example. The connecting portion 764 corresponds to the connecting portion 564, but, alternatively, may be replaced with a living hinge corresponding to the living hinge 669.

The clamp 760 is wrapped about the cap 730 in the same manner as described above with regard to the clamp 560 such that the locating ribs 765 are received in opposed inwardly extending corrugations 752 and in or adjacent the crotch 14 (not shown in FIG. 21). Before or after wrapping the clamp 760 about the cap 730, a flexible strip 774 of the tie wrap 770 is inserted through the openings and passages 772, 772A, 773, 773A as shown. The lead end 774A of the strip 774 is pulled through an opening 776A in a lock head 776 of the tie wrap 770. The tie wrap 770 is pulled tight to force the ribs 765 into the corrugations 752 and, in turn, the corrugations 752 into the crotch 14 as described above. The tie wrap 770 may be of conventional design, such devices being well known to those of skill in the art.

Figure 23:
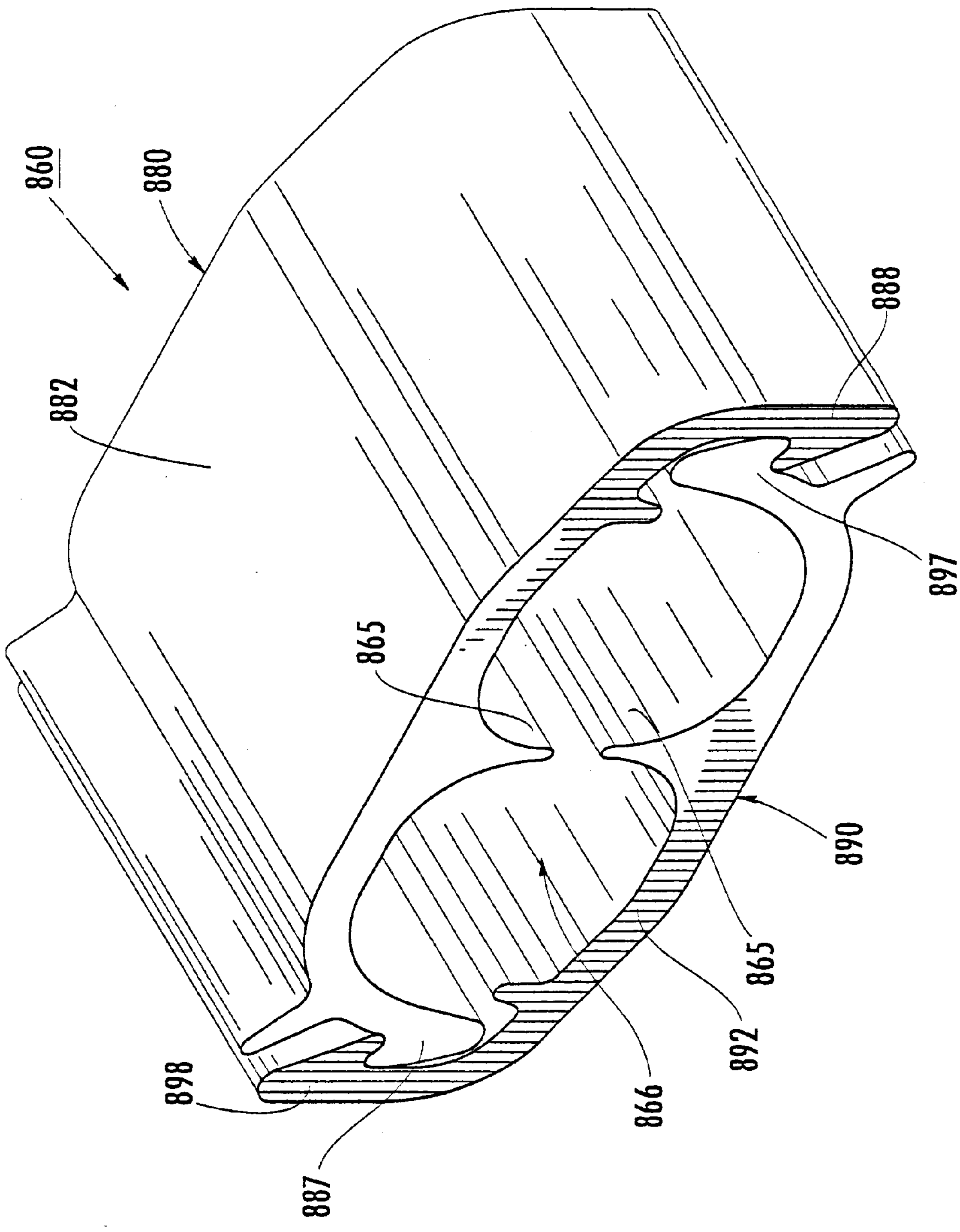
FIG. 23 is a perspective view of a clamp according to further embodiments of the present invention.
Figure 24:
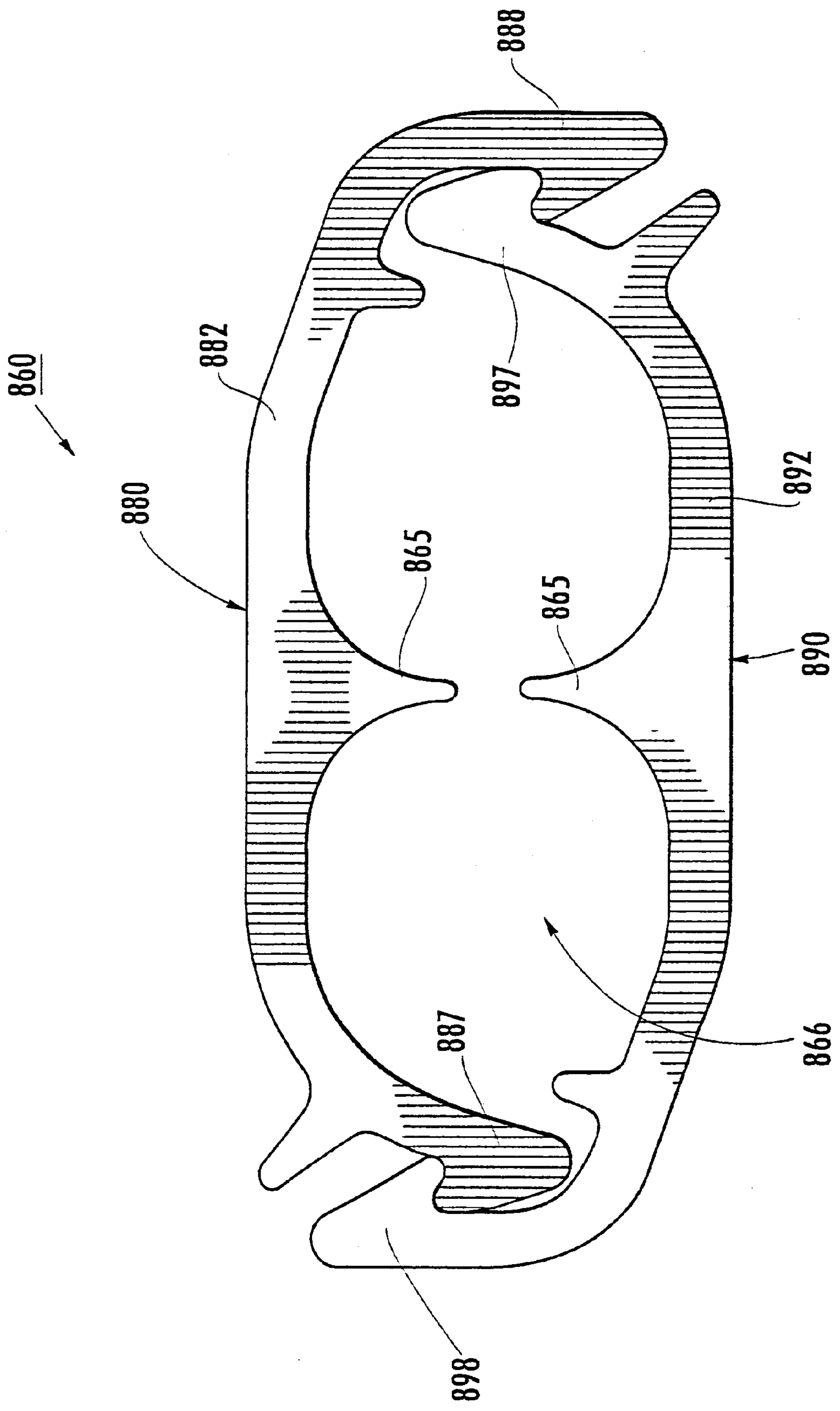
FIG. 24 is a side elevational view of the clamp of FIG. 23.

With reference to FIGS. 23 and 24, a clamp 860 according to further embodiments of the present invention is shown therein. The clamp 860 may be used in kits and in a similar manner to that described above with regard to the clamp 560. The clamp 860 includes a first member 880 and a second member 890. The first member 880 has a wall 882, a locating rib 865, and latching structures 888 and 887 on either end of the wall 882. Similarly, the second member 890 includes a wall 892, a locating rib 865, and latching structures 897 and 898 on either end thereof. The first and second members 880, 890 define a cavity 866 therebetween.

The clamp 860 may be used in the following manner. The connection 10 and gel corresponding to the gel 510 are installed in a cap corresponding to the cap 530 in the same manner as described above with regard to the kit 500. The first and second members 880 and 890 are placed on opposite sides of the cap such that the locating ribs 865 are positioned opposite one another and adjacent the crotch 14 of the connection 10. The first and second members 880, 890 are then forced together by hand or using a suitable tool until the latching structures 897 and 888 and the latching structures 887 and 898 are engaged as shown in FIGS. 23 and 24.

Notably, because the caps 530, 730, for example, employed with the clamps 560, 660, 760, 860 need not have holes to receive a pin, they may be formed without such holes. This may be beneficial during manufacture because the caps can be filled with the uncured gel material without providing means to prevent the uncured gel material from leaking through such holes.

Figure 25:
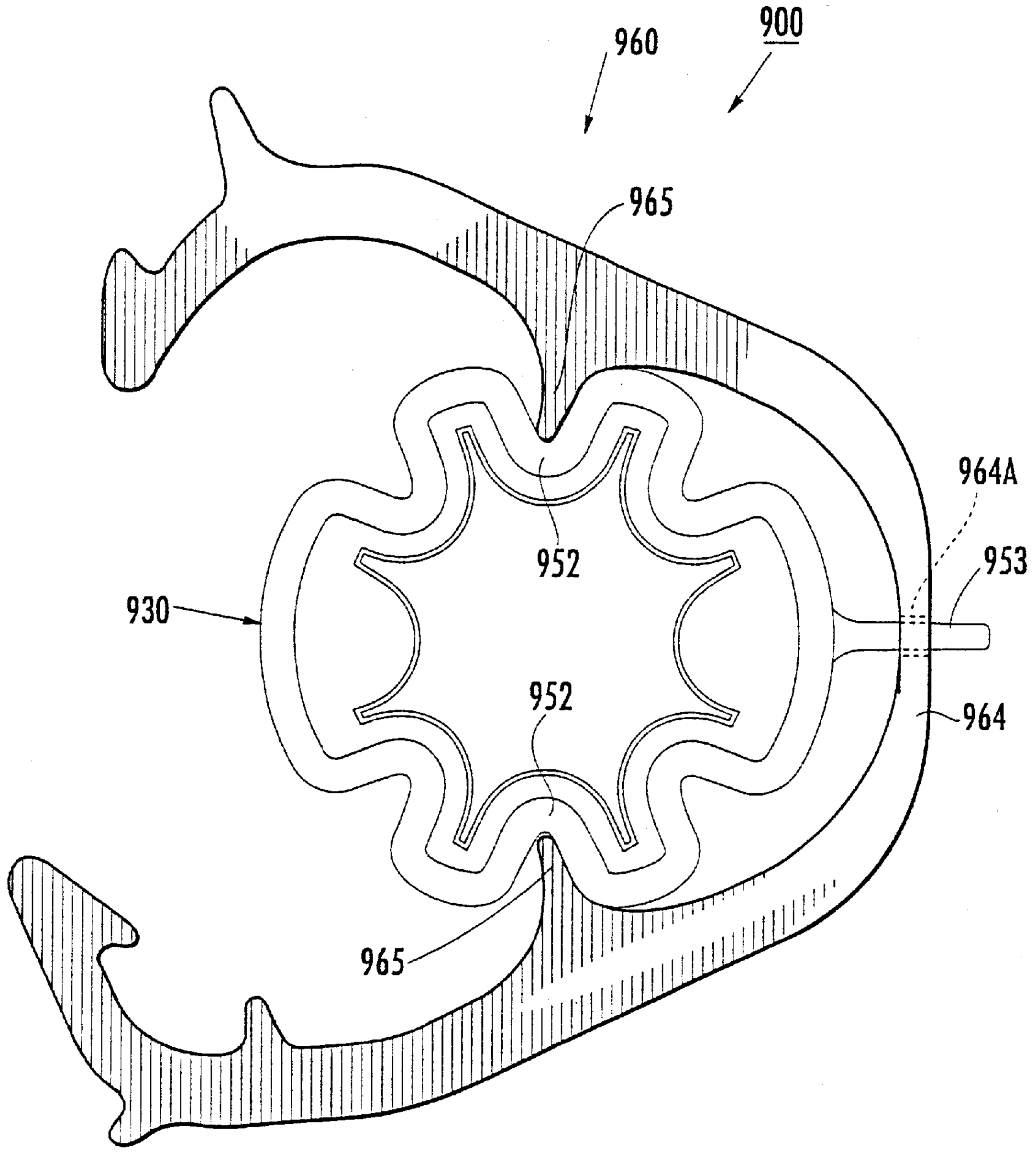
FIG. 25 is an end view of a clamp and a cap forming a part of a protected electrical connection assembly according to further embodiments of the present invention.
Figure 26:
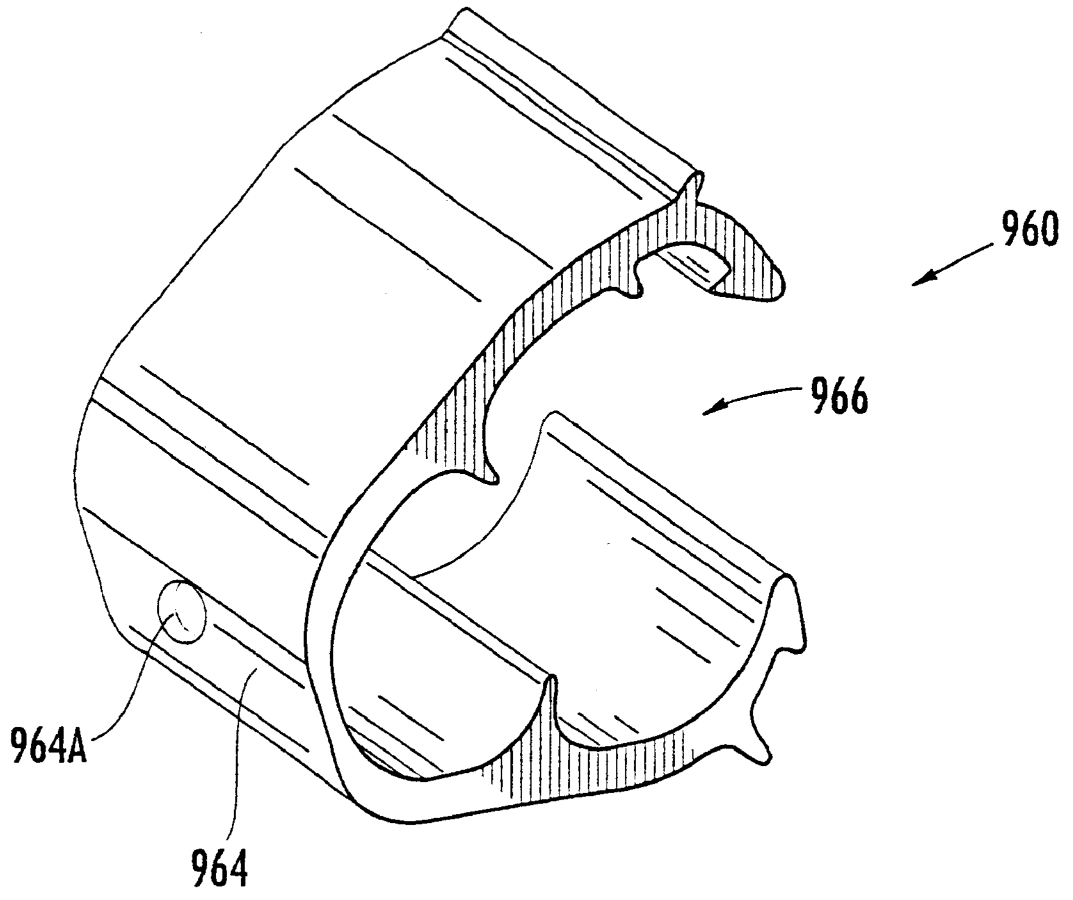
FIG. 26 is a perspective view of the clamp of FIG. 25.
Figure 27:
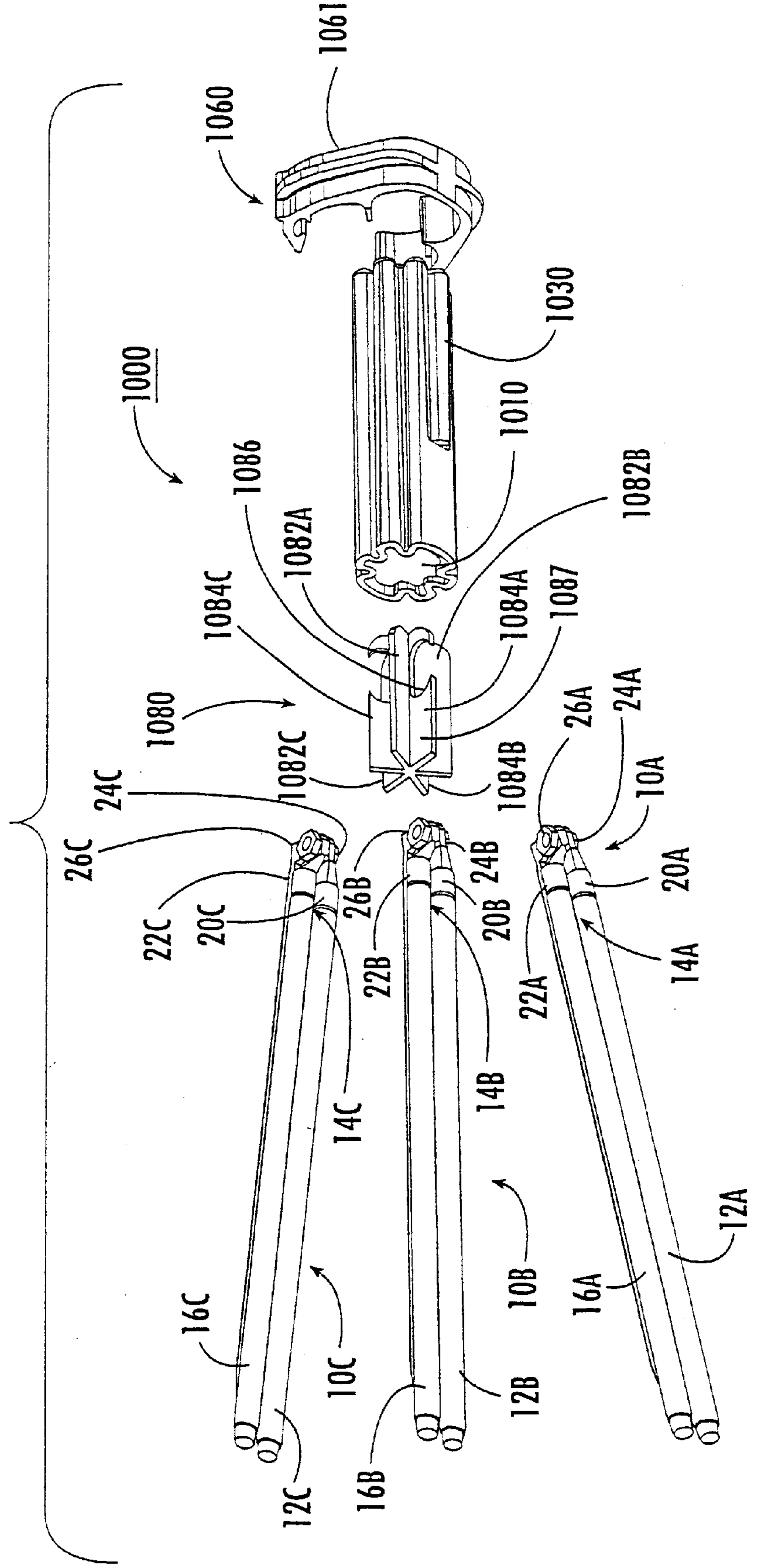
FIG. 27 is an exploded, perspective view of a protected electrical connection assembly according to further embodiments of the present invention.

With reference to FIG. 25, an electrical connection protector kit 900 according to further embodiments of the present invention is shown therein. The kit 900 may be used to form a protected electrical connection assembly corresponding to the assembly 501 and including the kit 900. For clarity, the gel and connection are omitted from FIG. 25. The clamp 960 of the kit 900 is also shown in FIG. 26.

The kit 900 generally corresponds to the kit 500 except that the clamp 960 includes a hole 964A in the connecting portion 964 and the cap 930 includes an outwardly extending positioning projection 953. The hole 964A communicates with the cavity 966 and preferably extends fully through the thickness of the connecting portion 964. The hole 964A is sized to receive the positioning projection 953 there through.

The clamp 960 may be mounted on the cap 930, the gel (not shown in FIG. 25) and the connection (not shown in FIG. 25) by placing the clamp 960 over the cap 930 such that the projection 953 is inserted through the hole 964A. In this manner, the clamp 960 is positively axially and radially located with respect to the cap 930. As a result, the locating ribs 965 are positively radially located such that they mate with the inwardly extending corrugations 952. Also, in this manner, the locating projections 965 are axially located with respect to the connection in the cap 930 such that the locating projections 965 are properly positioned adjacent the crotch 14 of the connection 10. Thereafter, the clamp 960 is secured in the manner described above with regard to the kit 500.

With reference to FIGS. 27–36, an electrical connection protector kit 1000 according to further embodiments of the present invention and a protected electrical connection assembly 1001 including the kit 1000 and a plurality of connections 10A, 10B, 10C mounted thereon are shown therein. The three connections 10A, 10B, 10C may be motor connections for each phase of a three-phase electric motor, for example.

The kit 1000 includes a cap 1030 corresponding to the cap 530 and a gel 1010 corresponding to the gel 510 disposed in the cap 1030. The kit 1000 also includes a clamp 1060 corresponding to the clamp 560 except for the further provision of reinforcing ribs 1061.

The kit 1000 differs from the kit 500 by the further inclusion of a separator insert 1080. The separator insert 1080 includes three axially extending, circumferentially spaced apart holding walls 1084A, 1084B, 1084C. The separator insert 1080 also includes three axially extending, circumferentially spaced apart separator walls 1082A, 1082B, 1082C alternatingly positioned between the holding walls 1084A, 1084B, 1084C. Axially extending, radially outwardly opening slots 1086 are formed in each of the holding walls 1084A, 1084B, 1084C. Each slot 1086 is defined in part by opposed barbs 1086A, 1086B on either end of the slot 1086. Each holding wall 1084A, 1084B, 1084C has a lower portion 1087 and an upper portion 1088 on either side of the slot 1086.

Preferably, the walls 1082A, 1082B, 1082C and 1084A, 1084B, 1084C are uniformly circumferentially spaced equidistantly about a central axis N—N (see FIGS. 34 and 36) of the separator insert 1080. Preferably, the holding walls 1084A, 1084B, 1084C are substantially identical. The holding walls 1084A, 1084B, 1084C may have the same dimensions as the separator walls 1082A, 1082B, 1082C with the exception of the slots 1086. The particular dimensions of the walls 1082A–C, 1084A–C and the slots 1086 may vary depending on the intended application.

The separator insert 1080 may be formed by any suitable means including, for example, molding or extrusion and cutting. The separator insert 1080 is formed of a relatively stiff, electrically insulative material. Suitable materials include polymers and thermoplastic elastomers.

Figure 28:
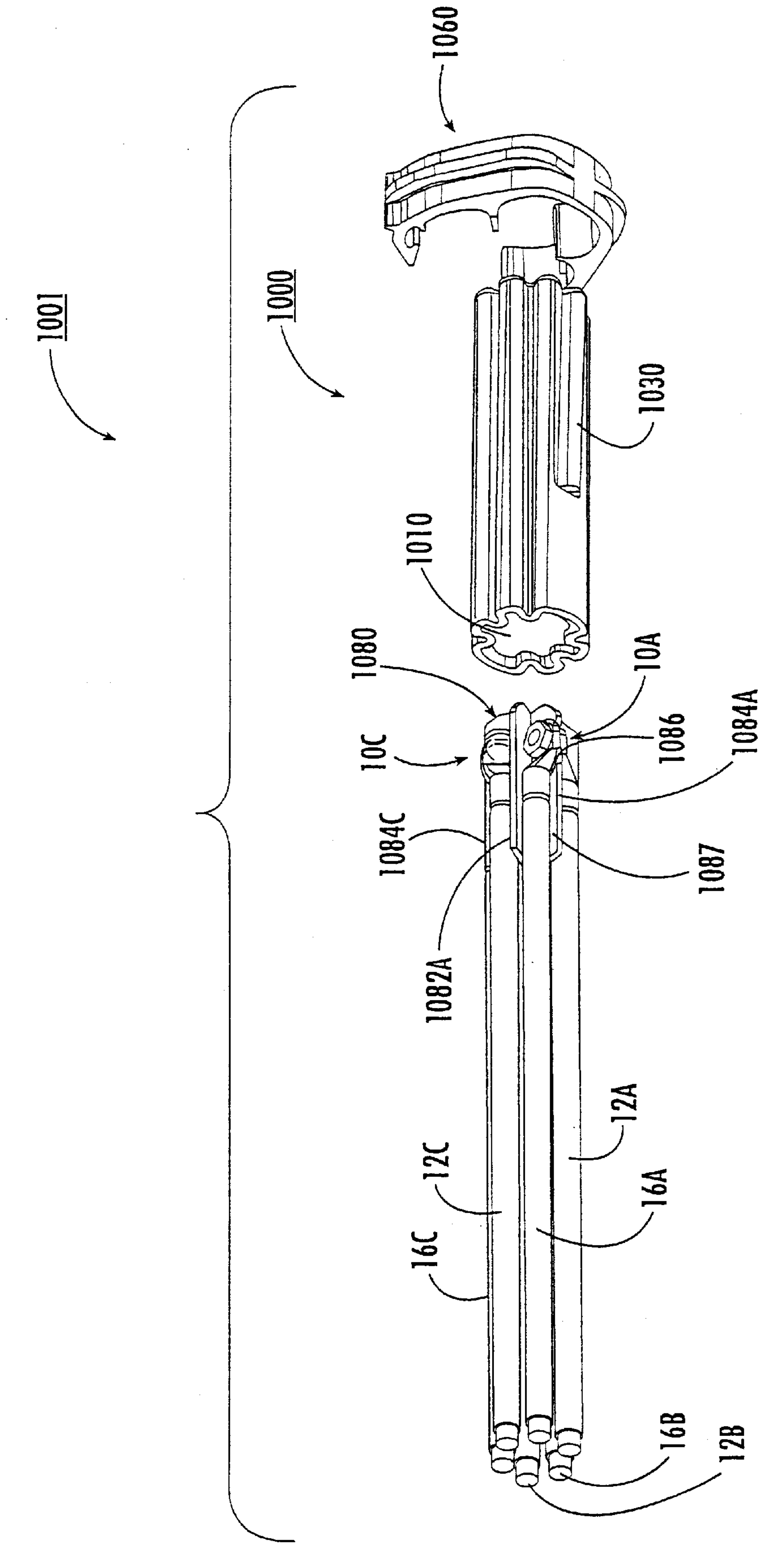
FIG. 28 is an exploded, perspective view of the connection assembly of FIG. 27 wherein connections thereof are mounted on a separator insert of the connection assembly.

The protected electrical connection assembly 1001 may be assembled in the following manner. The connections 10A, 10B and 10C are mounted on the holding walls 1084A, 1084B and 1084C, respectively, of the separator insert 1080. More particularly, as shown in FIG. 28, the connection 10A is inserted into the slot 1086 and looped over the barb 1086B of the holding wall 1084A such that the lower portion of the holding wall 1084A is received in the crotch 14A, and such that the cables 12A and 16A extend along opposite sides of the lower portion 1087 of the holding wall 1084A. The connections 10B and 10C are mounted in the same manner into the slots 1086 of the holding walls 1084B and 1084C, respectively.

Figure 29:
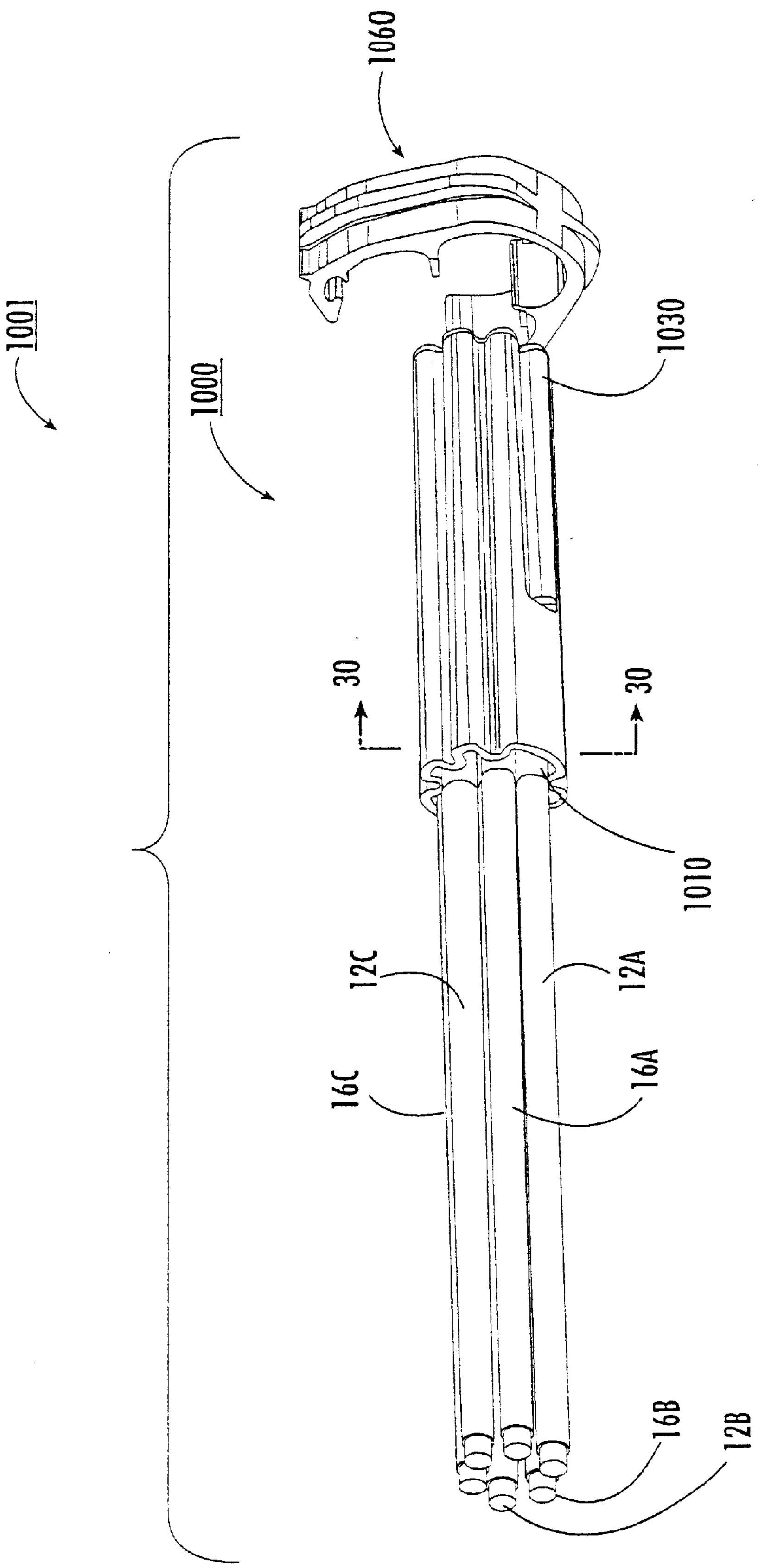
FIG. 29 is an exploded, perspective view of the connection assembly of FIG. 27 wherein the connections and the separator insert are inserted into gel and a cap of the connection assembly.
Figure 30:
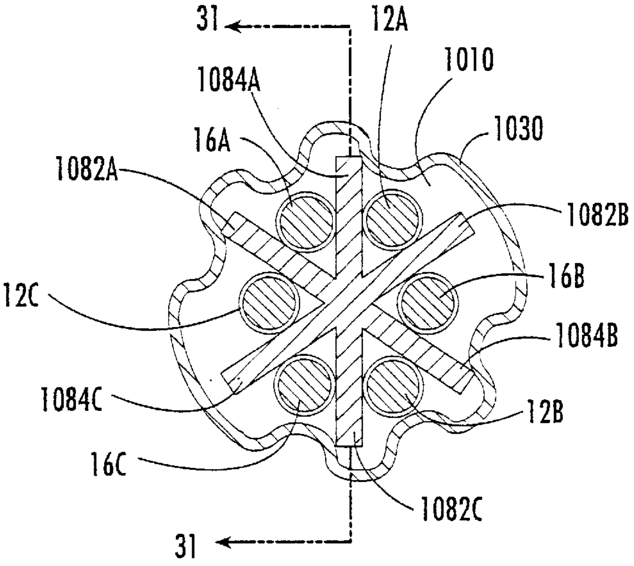
FIG. 30 is a cross-sectional view of the connection assembly of FIG. 27 taken along the line 30—30 of FIG. 29.
Figure 31:
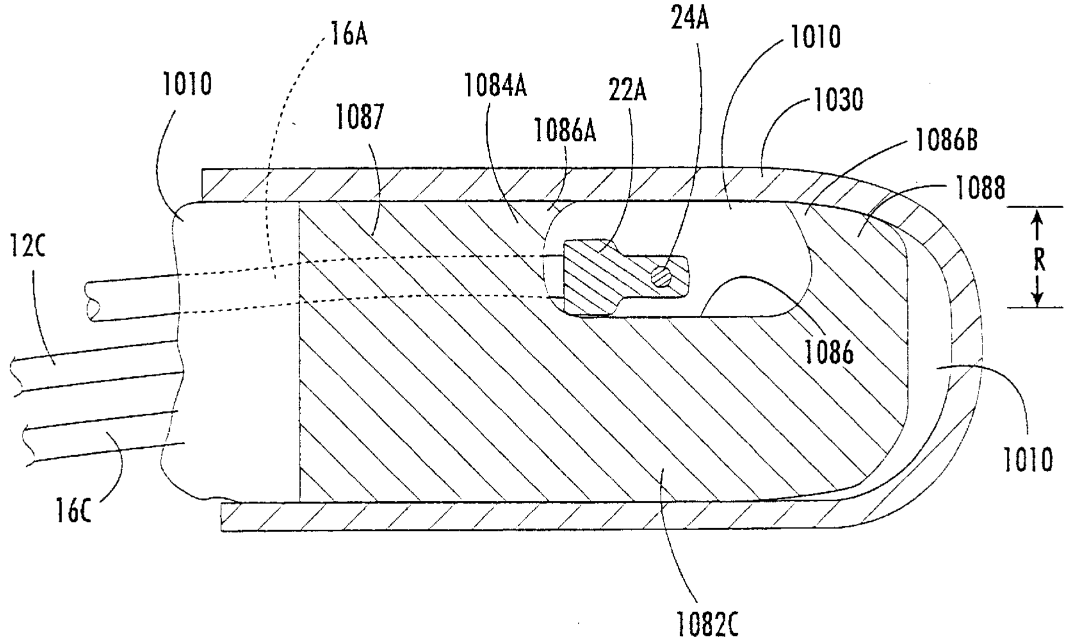
FIG. 31 is a cross-sectional view of the connection assembly of FIG. 27 taken along the line 31—31 of FIG. 30.

Thereafter, the separator insert 1080 and the connections 10A, 10B, 10C mounted thereon are inserted into the gel 1010 and the cap 1030 as shown in FIGS. 29–31. Preferably, the separator insert 1080 is inserted into the cap 1030 until the leading end of the separator insert 1080 abuts or is disposed in close proximity to the closed end of the cap 1030.

Figure 32:
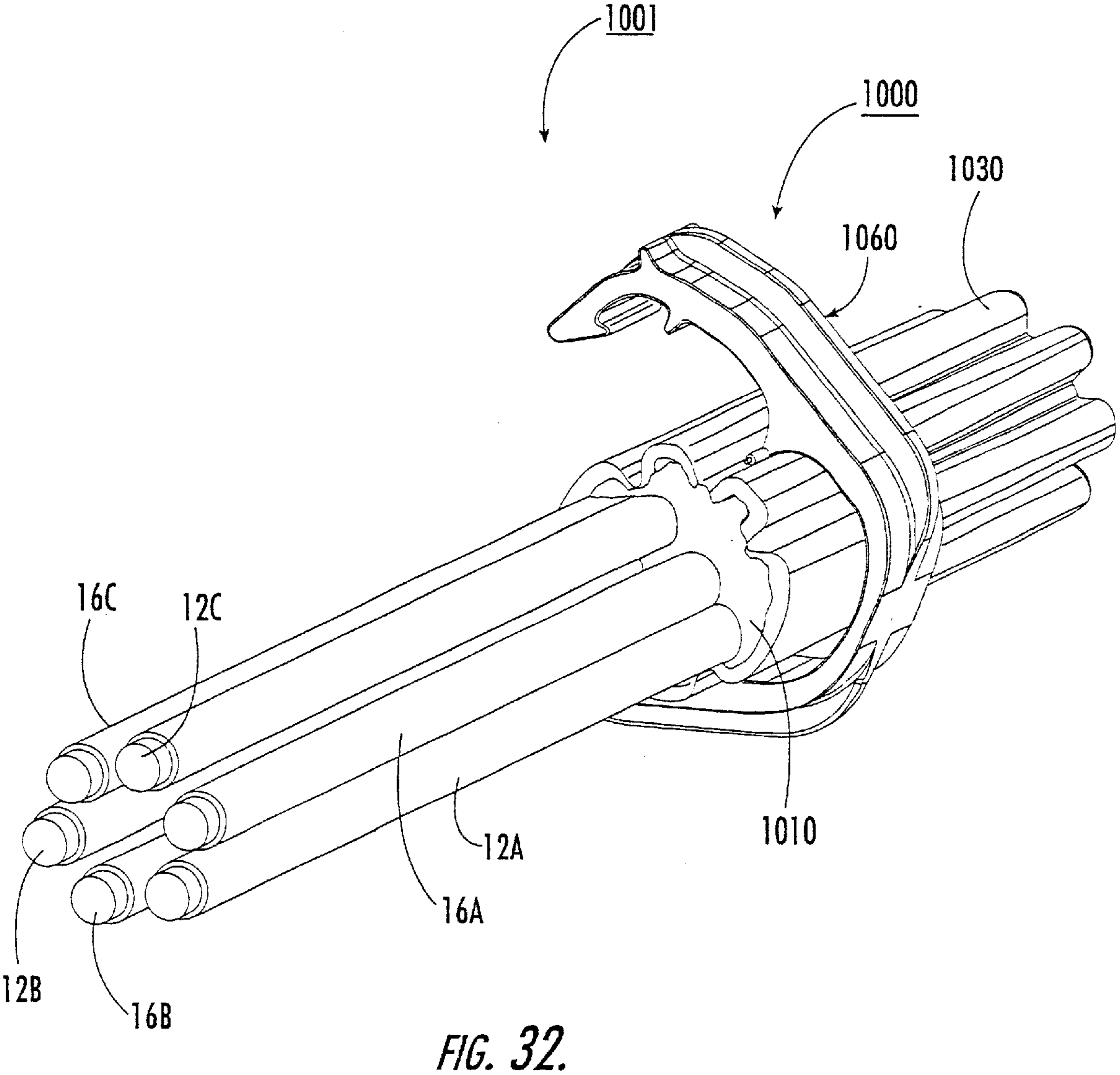
FIG. 32 is a perspective view of the connection assembly of FIG. 27 wherein the connection assembly is partially assembled.
Figure 33:
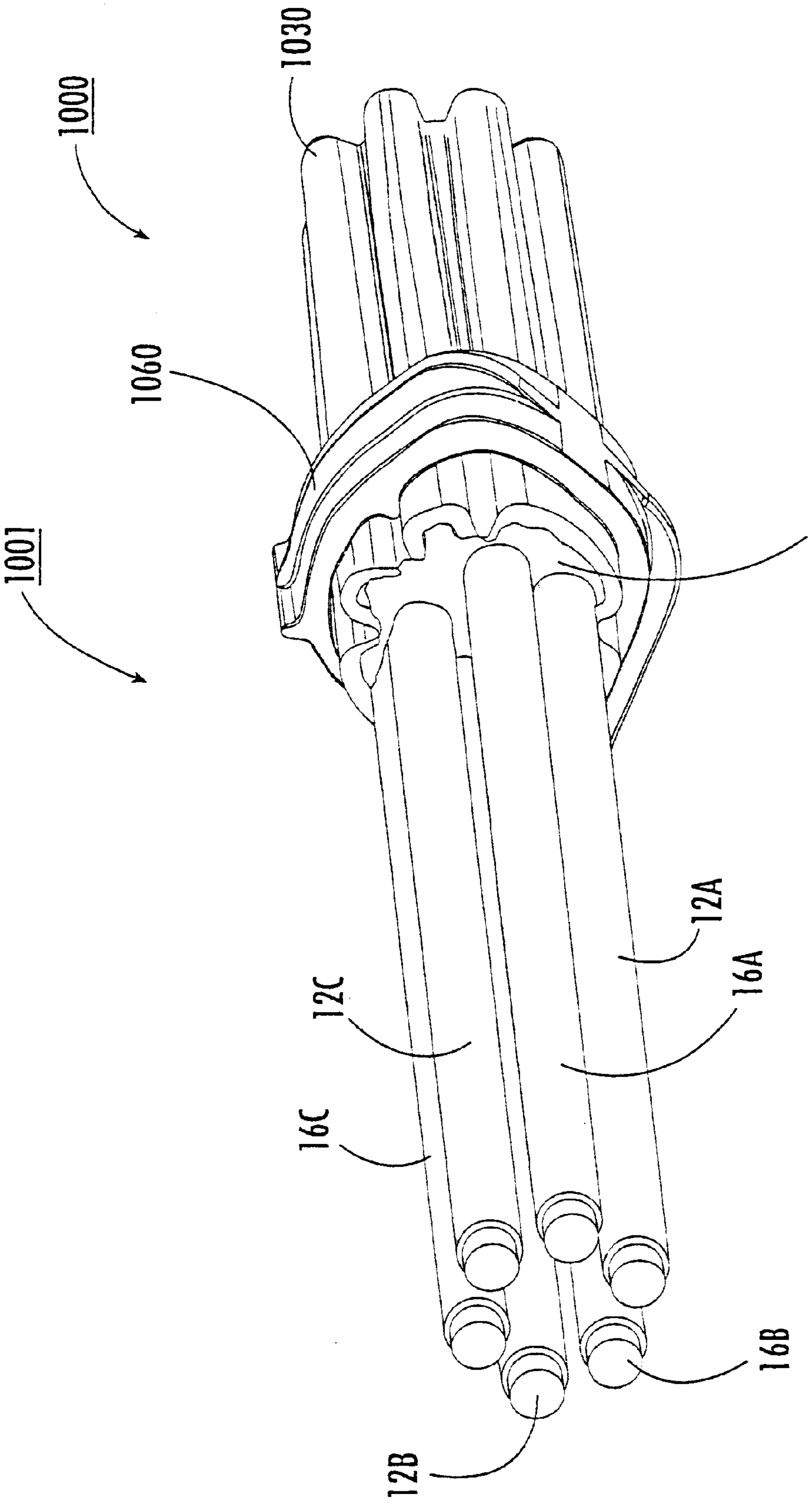
FIG. 33 is a perspective view of the connection assembly of FIG. 27.
Figure 34:
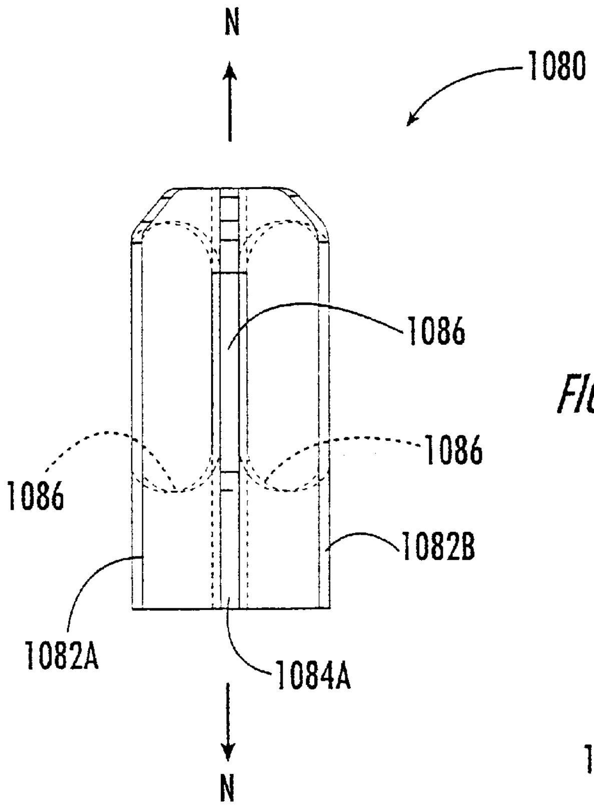
FIG. 34 is a first side elevational view of the separator insert of the connection assembly of FIG. 27.
Figure 35:
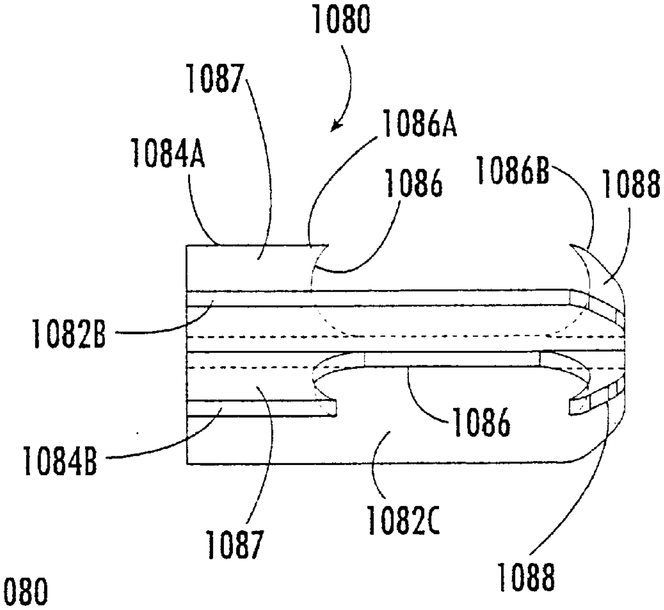
FIG. 35 is a second side elevational view of the separator insert of the connection assembly of FIG. 27.
Figure 36:
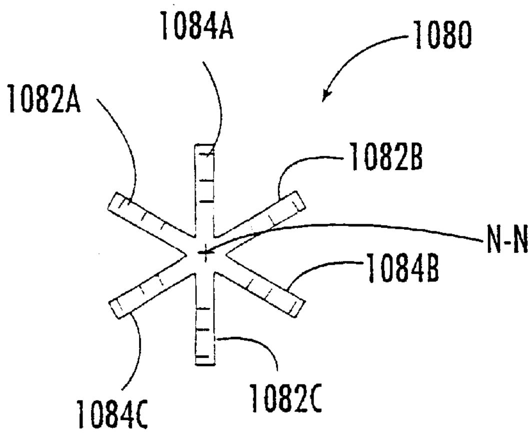
FIG. 36 is an end view of the separator insert of the connection assembly of FIG. 27.

Thereafter, the clamp 1060 is positioned as shown in FIG. 32. The clamp 1060 is then secured about the cap 1030, the gel 1010, and the connections 10A, 10B, 10C in the manner described above with regard to the clamp 560 and the connection assembly 501 and as shown in FIG. 33. Preferably, the clamp 1060 is also positioned so that it surrounds the lower portion of the separator insert 1080 and is located behind the lugs, bolts and nuts of the connections 10A, 10B, 10C as best seen in FIGS. 31 and 33. The cables 12A, 16A, 12B, 16B, 12C, 16C extend outwardly from the open end of the cap 1030 while the remainders of the connections 10A, 10B, 10C are enveloped in the gel 1010. Preferably, and as shown in FIG. 31, the gel 1010 deforms to fill substantially all of the empty spaces within the cap 1030 between the cap 1030, the insert member 1080 and the connections 10A, 10B, 10C.

As will be apparent to those of ordinary skill in the art upon reading the foregoing description and reviewing the associated drawings, the cap 1030 and the separator insert 1080 cooperate to form respective chambers for each of the connections 1010A, 1010B, 1010C. In particular, the connection 1010A is mechanically separated and electrically insulated from the connections 1010B and 1101C by the separator walls 1082B and 1082A, respectively, the connection 1010B is separated from the connections 1010A and 1010C by the separator walls 1082B and 1082C, respectively, and the connection 1010C is separated from the connections 1010A and 1010B by the separator walls 1082A and 1082C, respectively. The connections 10A, 10B, 10C are further electrically insulated from one another by the gel 1010. The connections 10A, 10B, 10C are securely maintained in position in the cap 1030 and with respect to one another by the slots 1086 and the clamp 1060. Preferably, the depth R (see FIG. 31) of the slots is greater than the maximum thickness of the conductive portion of the associated connection (e.g., 10A, 10B or 10C) such that, when the connection is mounted in the slot 186 as described below, the lugs 20A, 22A, 20B, 22B, 20C, 22C, the bolts 24A, 24B, 24C and the nuts 26A, 26B, 26C are substantially fully contained within a chamber or volume defined between the adjacent separator walls and bounded by the outer peripheral edges of the adjacent separator walls and the associated holding wall.

With reference to FIGS. 37–41, an electrical connection protector kit 1100 according to further embodiments of the present invention and a protected electrical connection assembly 1101 including the kit 1100 and a plurality of connections 10A, 10B, 10C mounted thereon are shown therein. The three connections 10A, 10B, 10C may be motor connections for each phase of a three-phase electric motor, for example.

The kit 1000 includes a cap 1130 corresponding to the cap 530 except that the cap 1130 is more rectangular in cross-section such that the interior cavity of the cap 1130 is substantially matched to the shape of a separator insert 1180. A gel 1110 corresponding to the gel 510 is disposed in the cap 1130. The kit 1100 also includes a clamp 1160 corresponding to the clamp 560.

The kit 1100 differs from the kit 1000 by the inclusion of the separator insert 1180 in place of the separator insert 1080. The separator insert 1180 includes three axially extending, spaced apart holding walls 1184A, 1184B, and 1184C. A pair of retaining projections 1185A, 1185B, and 1185C are provided above and axially spaced from the holding walls 1184A, 1184B, and 1184C, respectively. The separator insert 1180 also includes three axially extending, spaced apart separator walls 1182A, 1182B, 1182C alternatingly positioned between the holding walls 1184A, 1184B, 1184C. Axially extending, radially outwardly opening slots 1186 are defined between the holding walls 1184A, 1184B, 1184C and the adjacent retaining projections 1185A, 1185B, and 1185C. The separator insert 1180 may be formed in the manner and using the materials as described above with regard to the separator insert 1080.

The separator insert 1180 is further provided with axially extending flanges 1183 extending at an angle from the separator wall 1182B and axially extending flanges 1189 extending at an angle from the separator walls 1182A and 1182C. The separator walls 1183, 1189 serve to further electrically isolate the connections 10A, 10B, 10C from one another. More particularly, the flanges 1183, 1189 provide a greater insulation distance and additional leakage distance (i.e., the creep distance for current between adjacent connections 10A, 10B, 10C). Preferably, the flanges 1183 each have a width F (FIG. 40) of between about ⅛ and ½ inch. Preferably, the flanges 1189 each have a width G (FIG. 40) of between about ⅛ and ½ inch. Preferably, the flanges 1183, 1189 extend perpendicularly to the respective separator walls 1182A and 1182C, however, the flanges may be disposed at lesser or greater angles.

Figure 37:
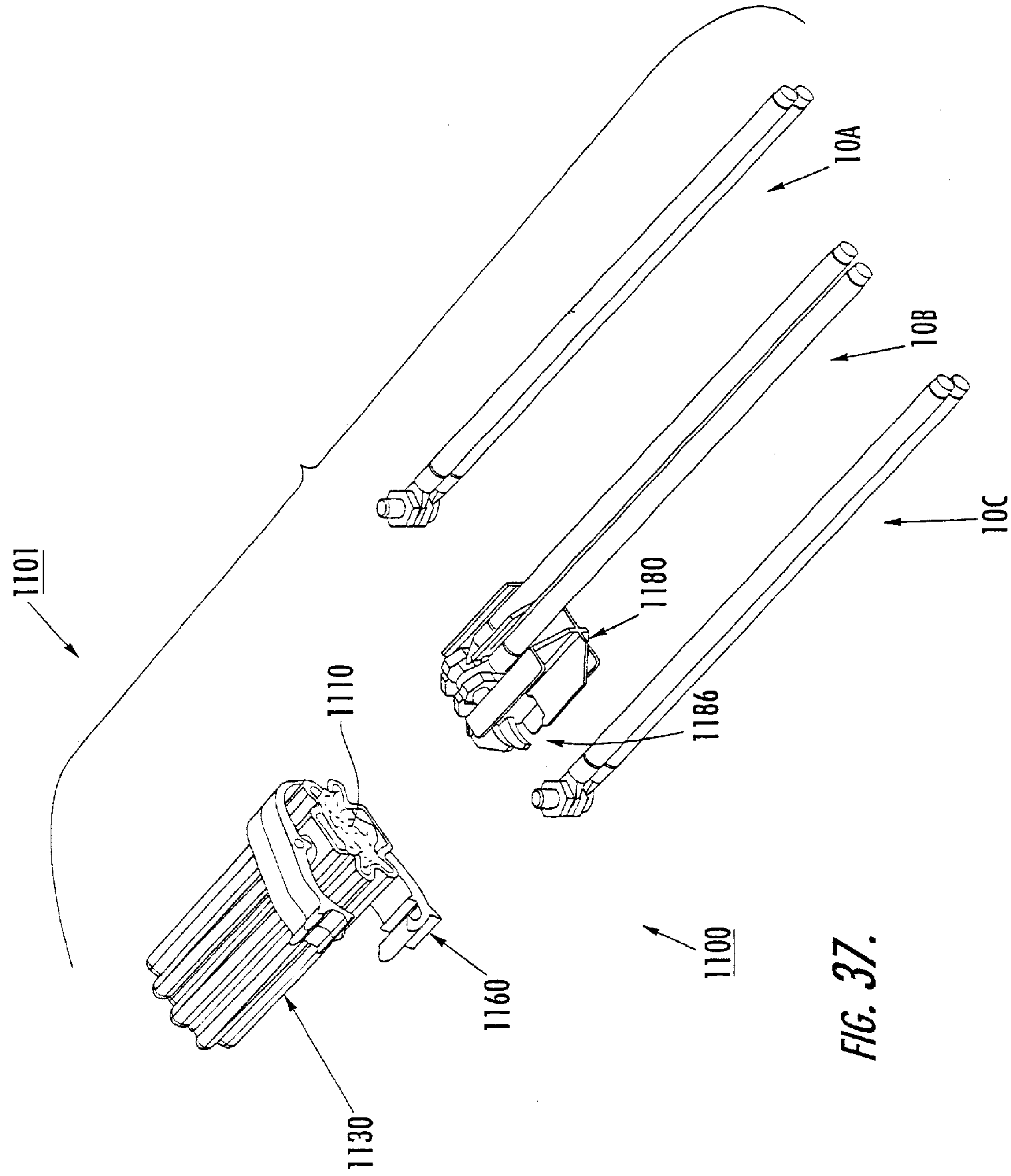
FIG. 37 is an exploded, perspective view of a protected electrical connection assembly according to further embodiments of the present invention, wherein a connection thereof is mounted on a separator insert of the connection assembly.
Figure 38:
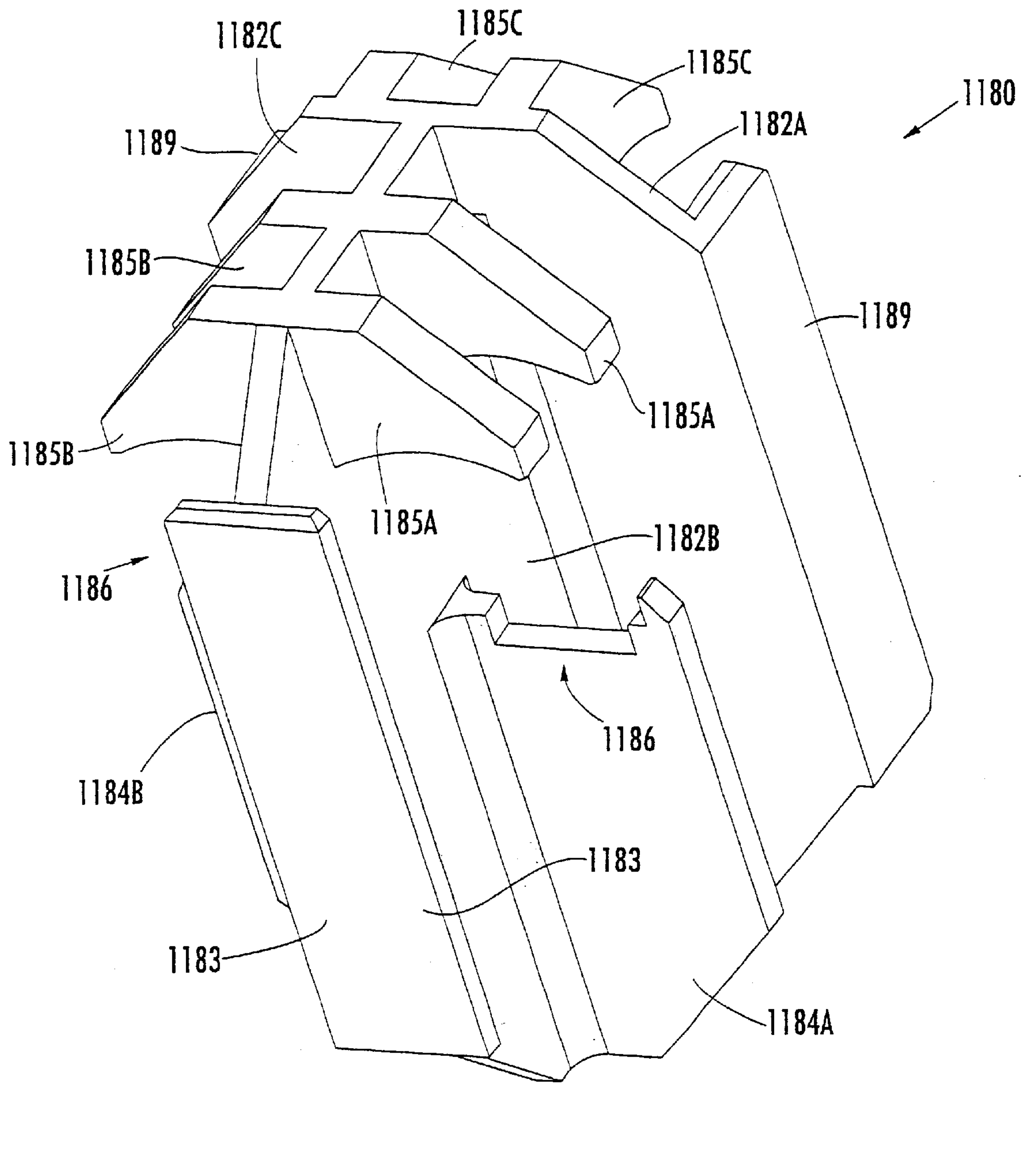
FIG. 38 is a rear perspective view of the separator insert of the connection assembly of FIG. 37.
Figure 39:
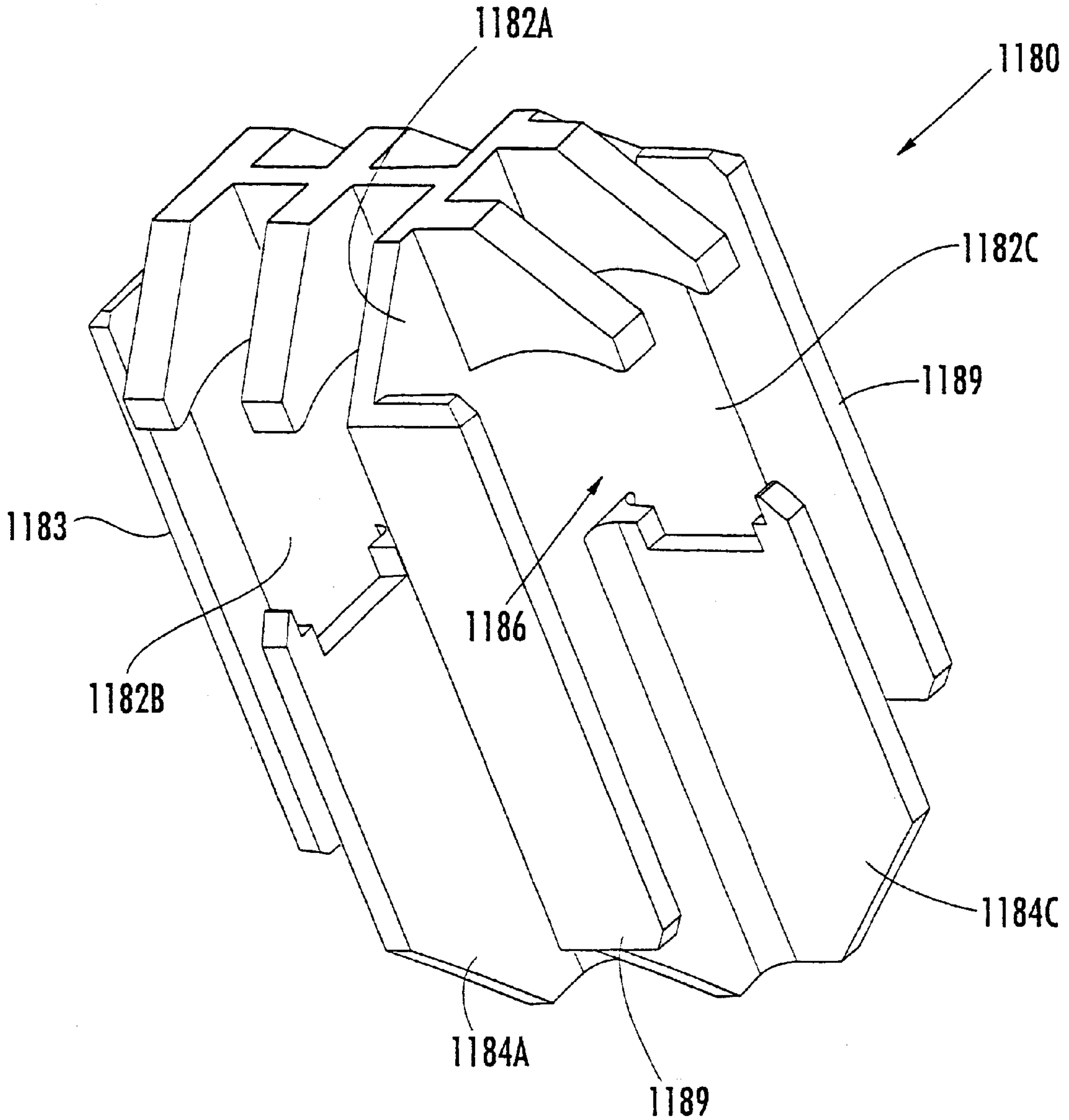
FIG. 39 is a front perspective view of the separator insert of the connection assembly of FIG. 37.
Figure 40:
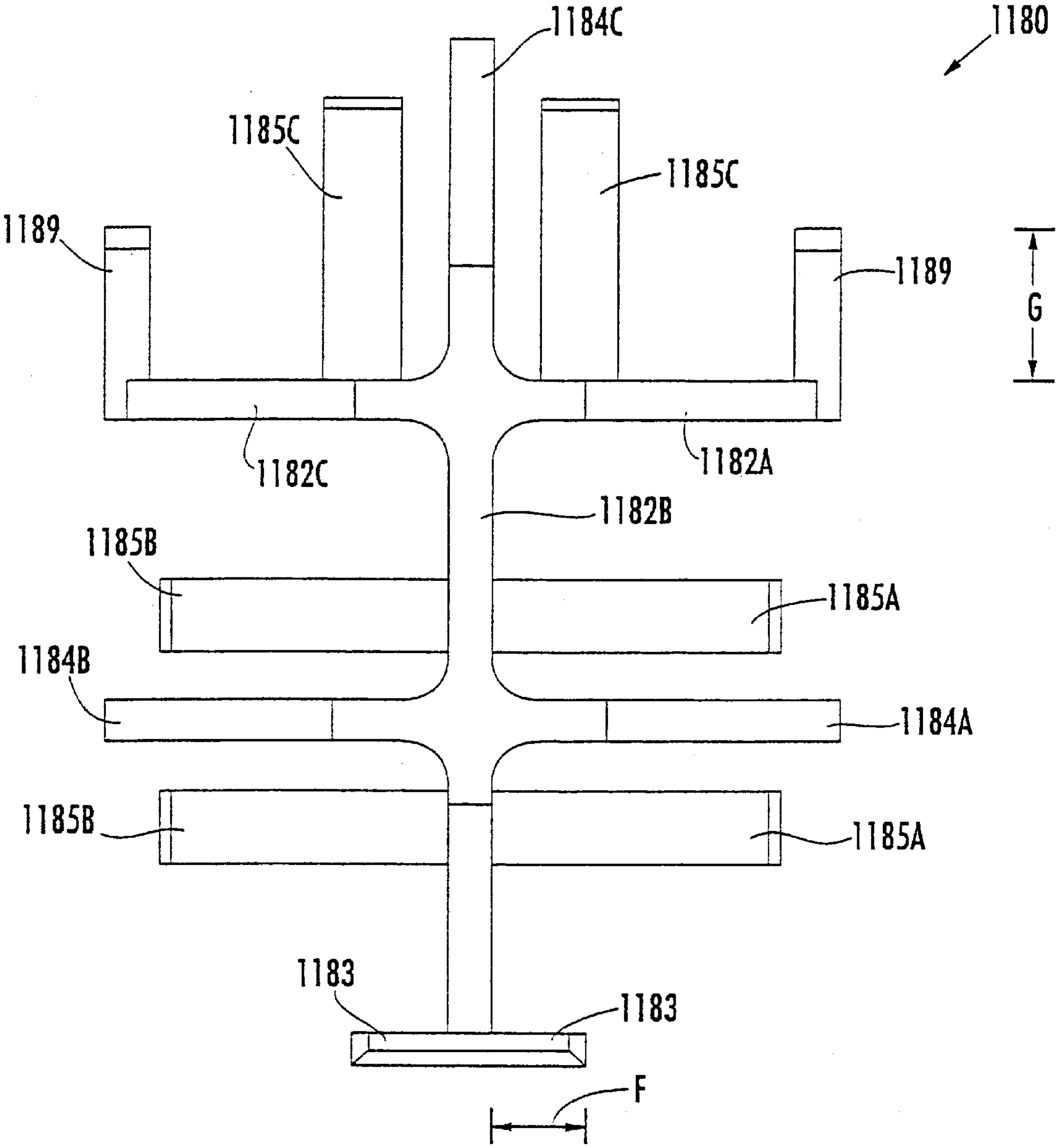
FIG. 40 is an end view of the separator insert of the connection assembly of FIG. 37.
Figure 41:
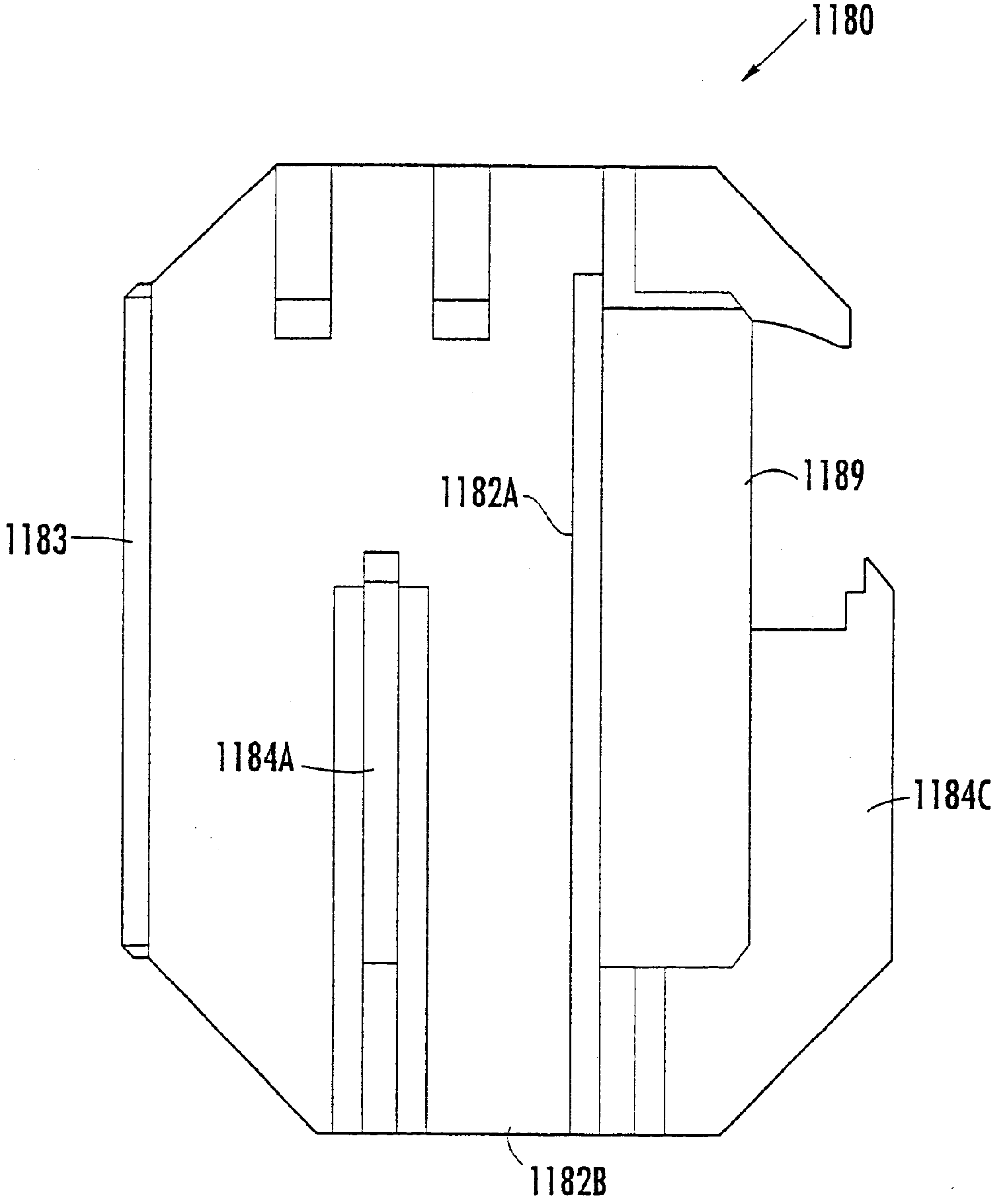
FIG. 41 is a side elevational view of the separator insert of the connection assembly of FIG. 37.

The protected electrical connection assembly 1101 may be assembled in the substantially the same manner as discussed above with regard to the electrical connection assembly 1001. More particularly, the connections 10A, 10B, 10C are each looped into a respective one of the slots 1186. Thereafter, the separator insert 1180 and the connections 10A, 10B, 10C mounted thereon are inserted into the gel 1110 and the cap 1130. Preferably, the separator insert 1180 is inserted into the cap 1130 until the leading end of the separator insert 1180 abuts or is disposed in close proximity to the closed end of the cap 1130. Thereafter, the clamp 1060 is positioned as shown in FIG. 37 and secured about the cap 1130, the gel 1110, and the connections 10A, 10B, and 10C.

As will be apparent to those of ordinary skill in the art upon reading the foregoing description and reviewing the associated drawings, the kit 1100 provides the advantages discussed above with regard to the kit 1000. Additionally, the kit 1100 provides additional: isolation between the connections 10A, 10B, 10C by means of the flanges 1183, 1189.

It will be appreciated from the foregoing that the kits 1000, 1100 provide a number of advantages. The kits 1000, 1100 can provide protection and mutual electrical isolation for multiple connections in a relatively small space or volume. The protected electrical connection assemblies 1001, 1101 may be conveniently assembled without requiring special tools. The kits 1000, 1100 can provide cost effective means for protecting and isolating the connections 10A, 10B, and 10C.

Any of the clamps 660, 760, 860, 960 or other suitable clamp may be used in place of the clamps 1060, 1160 in the kits 1000, 1100. Moreover, any other suitable securing means may be used in place of or in addition to the clamps 1060, 1160 or other clamps, including the pins and caps of the several embodiments 100, 200, 300, 400 described above or wrapping tape.

The separator inserts 1080, 1180 may have more or fewer holding walls; however, each holding wall is preferably separated from the two adjacent holding walls by a separator wall. It is not necessary for a connection (e.g., 1A, 10B, 10C) to be located in each available holding wall slot 1086, 1186.

The foregoing kits 500, 700, 900, 1000, 1100 and kits including the clamps 660, 860 and other kits as described herein may also be used without the gels (e.g., the gels 110, 120, etc.) to form protected electrical connection assemblies.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A connection protector kit for use with a plurality of electrical stub connections, said kit comprising:

a) a cap defining an opening and having an interior wall defining a cavity, said cavity communicating with said opening;

b) a separator insert defining an insert axis and including:
   a plurality of holding walls, each of said holding walls being adapted to hold a respective one of the stub connections; and
   a plurality of axially extending separator walls interposed between adjacent ones of said holding walls;

c) wherein said cavity is adapted to receive said separator insert and the stub connections.

2. The kit of claim 1 wherein each of said holding walls extends axially.

3. The kit of claim 1 wherein each of said holding walls includes a slot therein.

4. The kit of claim 3 wherein each of said slots extends axially and opens radially outwardly.

5. The kit of claim 1 wherein said holding walls and said separator walls are substantially uniformly circumferentially spaced about said insert axis.

6. The kit of claim 1 including at least one axially extending flange extending at an angle from at least one of said separator walls.

7. The kit of claim 1 wherein said separator insert is formed of an electrically insulative material.

8. The kit of claim 7 wherein said separator insert is formed of a material selected from the group consisting of a polymer and a thermoplastic elastomer.

9. The kit of claim 1 further including a gel disposed in said cavity.

10. The kit of claim 1 wherein said cap is flexible and an end of said cap opposite said opening is closed.

11. The kit of claim 1 including a retainer operable to secure said cap over said separator insert and the stub connections.

12. The kit of claim 11 wherein said retainer is operable to maintain said cap in a compressed position.

13. The kit of claim 11 wherein said retainer includes a clamp.

14. A protected electrical connection assembly comprising:

a) a flexible cap defining an opening and having an interior wall defining a cavity, said cavity communicating with said opening;

b) a separator insert disposed in said cavity, said separator insert defining an insert axis and including:

a plurality of holding walls; and a plurality of axially extending separator walls interposed between adjacent ones of said holding walls; and c) a plurality of electrical stub connections extending through said opening;

d) wherein each of said holding walls holds a respective one of said stub connections.

15. The assembly of claim 14 wherein each of said holding walls extends axially.

16. The assembly of claim 14 wherein:

each of said holding walls includes a slot therein;

each of said stub connections is mounted in a respective one of said slots and includes a pair of elongated, electrically conductive elements joined at respective terminal ends thereof and extending along opposed sides of said holding wall including said respective one of said slots.

17. The assembly of claim 16 wherein each of said slots extends axially and radially opens outwardly.

18. The assembly of claim 14 wherein said holding walls and said separator walls are substantially uniformly circumferentially spaced about said insert axis.

19. The assembly of claim 14 including at least one axially extending flange extending at an angle from at least one of said separator walls.

20. The assembly of claim 14 wherein said separator insert is formed of an electrically insulative material.

21. The assembly of claim 20 wherein said separator insert is formed of a material selected from the group consisting of a polymer and a thermoplastic elastomer.

22. The assembly of claim 14 further including a gel disposed in said cavity.

23. The assembly of claim 14 wherein said cap is flexible and an end of said cap opposite said opening is closed.

24. The assembly of claim 14 including a retainer securing said cap over said separator insert and said stub connections.

25. The assembly of claim 24 wherein said retainer maintains said cap in a compressed position.

26. The assembly of claim 24 wherein said retainer includes a clamp.

27. A separator insert for use with a plurality of electrical stub connections, said separator insert defining an insert axis and including:

a) a plurality of holding walls, each of said holding walls being adapted to hold a respective one of the stub connections; and b) a plurality of axially extending separator walls interposed between adjacent ones of said holding walls.

28. The separator insert of claim 27 wherein each of said holding walls extends axially.

29. The separator insert of claim 27 wherein each of said holding walls includes a slot therein.

30. The separator insert of claim 29 wherein each of said slots extends axially and opens radially outwardly.

31. The separator insert of claim 27 wherein said holding walls and said separator walls are substantially uniformly circumferentially spaced about said insert axis.

32. The separator insert of claim 27 including at least one axially extending flange extending at an angle from at least one of said separator walls.

33. The separator insert of claim 27 wherein said separator insert is formed of an electrically insulative material.

34. The separator insert of claim 33 wherein said separator insert is formed of a material selected from the group consisting of a polymer and a thermoplastic elastomer.

35. A method for protecting a plurality of electrical stub connections, said method comprising the steps of:

providing a separator insert defining an insert axis and including:

a plurality of holding walls, each of the holding walls being adapted to hold a respective one of the stub connections; and a plurality of separator walls interposed between adjacent ones of the holding walls; and mounting each of the stub connections on a respective one of the holding walls.

36. The method of claim 35 wherein each of the holding walls extends axially.

37. The method of claim 35 wherein said step of mounting each of the stub connections on a respective one of the holding walls includes placing each of the stub connections in a slot in the respective holding wall such that a pair of elongated, electrically conductive elements of the stub connection extend along opposed sides of the holding wall.

38. The method of claim 35 further including the step of inserting the separator insert with the stub connections thereon into a cap.

39. The method of claim 38 further including the step of placing a gel in the cap.

40. The method of claim 35 wherein the separator member includes at least one axially extending flange extending at an angle from at least one of the separator walls.

41. The method of claim 35 including securing the cap over the separator insert and the stub connections using a retainer.

42. The method of claim 41 wherein the retainer includes a clamp.

* * * * *